US00RE36479E

United States Patent [19]

Forsberg

[11] E Patent Number: Re. 36,479

[45] Reissued Date of Patent: Jan. 4, 2000

[54] AQUEOUS COMPOSITIONS CONTAINING NITROGEN-CONTAINING SALTS

[75] Inventor: John Wesley Forsberg, Mentor, Ohio

[73] Assignee: The Lubrizol Corporation, Wickliffe, Ohio

[21] Appl. No.: 08/726,874

[22] Filed: Oct. 4, 1996

Related U.S. Patent Documents

Reissue of:

[64] Patent No.: 4,770,803
Issued: Sep. 13, 1988
Appl. No.: 06/881,870
Filed: Jul. 3, 1986

U.S. Applications:

[63] Continuation of application No. 08/306,862, Sep. 15, 1994, abandoned, which is a continuation of application No. 08/031,087, Mar. 12, 1993, abandoned, which is a continuation of application No. 07/785,891, Oct. 22, 1991, abandoned, which is a continuation of application No. 07/547,910, Jul. 30, 1990, abandoned.

[51] Int. Cl.[7] ..... C10M 173/00; C10M 129/38

[52] U.S. Cl. ..... 252/77; 252/75; 252/76; 252/79; 508/506; 508/511; 508/527; 508/530; 508/532

[58] Field of Search ..... 252/75, 74, 77, 252/76, 79; 508/506, 511, 527, 530, 532

[56] References Cited

U.S. PATENT DOCUMENTS

| | | | |
|---|---|---|---|
| Re. 26,433 | 8/1968 | Le Suer | 252/33.6 |
| Re. 27,582 | 2/1973 | Kahn et al. | 252/32.7 E |
| 2,008,939 | 7/1935 | Tufts | 205/21 |
| 2,060,110 | 11/1936 | Paxton | 252/5 |
| 2,287,639 | 6/1942 | Pings | 252/18 |
| 2,345,199 | 3/1944 | Hodson | 252/49 |
| 2,455,961 | 12/1948 | Walker | 252/75 |

(List continued on next page.)

FOREIGN PATENT DOCUMENTS

| | | |
|---|---|---|
| 464244 | 5/1973 | Australia . |
| 984409 | 2/1965 | United Kingdom . |
| 1009197 | 11/1965 | United Kingdom . |

(List continued on next page.)

OTHER PUBLICATIONS

International Search Report for International Application No. PCT/US87/01542.

(List continued on next page.)

*Primary Examiner*—Christine Skane
*Attorney, Agent, or Firm*—Joseph P. Fischer; James L. Cordek

[57] ABSTRACT

A composition is disclosed which comprises water and at least one carboxylic salt dispersed or dissolved in said water, said salt being derived from:

(A)(I) at least one derivative formed by reacting at least one $C_{12-500}$ hydrocarbyl-substituted carboxylic acid or anhydride with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydrocarbyl-substituted acid or anhydride simultaneously or sequentially in any order; and (B) at least one amine, alkali or alkaline earth metal, or alkali or alkaline earth metal compound; with the proviso that:

(ii) when component (A) is the reaction product of said hydrocarbyl-substituted carboxylic acid or anhydride and an N-(hydroxyl-substituted hydrocarbyl) amine and/or hydroxy-substituted poly(hydrocarbyloxy) analog of said N-(hydroxyl-substituted hydrocarbyl) amine, component (B) is other than an N-(hydroxyl-substituted hydrocarbyl) amine and/or hydroxyl-substituted poly(hydrocarbyloxy) analog of said N-(hydroxyl-substituted hydrocarbyl) amine. These compositions include aqueous concentrates and water-based functional fluids.

68 Claims, No Drawings

U.S. PATENT DOCUMENTS

| | | | |
|---|---|---|---|
| 2,458,425 | 1/1949 | Rocchini | 252/33.6 |
| 2,588,412 | 3/1952 | Rocchini | 252/51.5 |
| 2,858,329 | 10/1958 | Braaten et al. | 260/485 |
| 2,914,975 | 12/1959 | Cavanaugh et al. | 80/60 |
| 2,944,976 | 7/1960 | Waters et al. | 252/76 |
| 2,951,039 | 8/1960 | Salisburg et al. | 252/33.3 |
| 2,956,951 | 10/1960 | Furey | 252/48.2 |
| 3,005,776 | 10/1961 | Langer et al. | 252/77 |
| 3,006,849 | 10/1961 | Plemich | 252/34.7 |
| 3,007,871 | 11/1961 | Pardee et al. | 252/46.4 |
| 3,027,324 | 3/1962 | Rosenberg | 252/8.5 |
| 3,047,493 | 7/1962 | Rosenberg | 252/8.5 |
| 3,048,538 | 8/1962 | Rosenberg et al. | 252/49.3 |
| 3,087,936 | 4/1963 | Lesuer | 260/326.3 |
| 3,105,050 | 9/1963 | Fischer | 252/76 |
| 3,177,144 | 4/1965 | Resmer et al. | 252/32.5 |
| 3,216,936 | 11/1965 | LeSuer | 252/32.7 |
| 3,219,666 | 11/1965 | Norman et al. | 260/268 |
| 3,227,652 | 1/1966 | Ackerman | 252/49.5 |
| 3,249,538 | 5/1966 | Freier et al. | 252/18 |
| 3,252,908 | 5/1966 | Coleman | 252/31 |
| 3,255,108 | 6/1966 | Wiese | 252/32.7 |
| 3,269,946 | 8/1966 | Wiese | 252/32.5 |
| 3,311,561 | 3/1967 | Anderson et al. | 252/75 |
| 3,324,032 | 6/1967 | O'Halloran | 252/46.6 |
| 3,341,456 | 9/1967 | Sawyer | 252/75 |
| 3,350,307 | 10/1967 | Brown et al. | 252/30 |
| 3,364,001 | 1/1968 | Drummond et al. | 44/71 |
| 3,378,494 | 4/1968 | Berger | 252/77 |
| 3,390,082 | 6/1968 | LeSuer et al. | 252/32.7 |
| 3,414,517 | 12/1968 | Mosier et al. | 252/33 |
| 3,489,682 | 1/1970 | LeSuer | 252/32.7 |
| 3,502,677 | 3/1970 | LeSuer | 252/32.7 |
| 3,519,570 | 7/1970 | McCarty | 252/135 |
| 3,574,110 | 4/1971 | Hampson et al. | 252/33 |
| 3,629,119 | 12/1971 | Weaver | 252/77 |
| 3,639,277 | 2/1972 | Poettmann et al. | 252/78 |
| 3,657,123 | 4/1972 | Stram | 252/34.7 |
| 3,658,707 | 4/1972 | Delafield et al. | 252/51.5 A |
| 3,687,644 | 8/1972 | Delafield et al. | 44/56 |
| 3,708,522 | 1/1973 | LeSuer | 260/485 G |
| 3,734,859 | 5/1973 | Ward | 252/108 |
| 3,796,662 | 3/1974 | Lyle et al. | 252/32.7 E |
| 3,798,164 | 3/1974 | Kmet et al. | 252/47.5 |
| 3,809,651 | 5/1974 | Crawford et al. | 252/47.5 |
| 3,839,419 | 10/1974 | Samour et al. | 260/485 H |
| 3,844,960 | 10/1974 | Brietigam et al. | 252/32.7 E |
| 3,857,879 | 12/1974 | Abramitis | 260/501.11 |
| 3,879,306 | 4/1975 | Kablaoul et al. | 252/51.5 A |
| 3,902,929 | 9/1975 | Meszaros | 148/28 |
| 3,920,562 | 11/1975 | Foehr | 252/32.7 E |
| 3,920,731 | 11/1975 | Naik | 260/485 H |
| 3,933,659 | 1/1976 | Lyle et al. | 252/32.7 E |
| 3,936,480 | 2/1976 | Demoures et al. | 260/404.5 |
| 3,945,933 | 3/1976 | Chibnik et al. | 252/33.3 |
| 3,992,312 | 11/1976 | Gendida et al. | 252/77 |
| 3,995,465 | 12/1976 | Felton, Jr. | 72/42 |
| 4,010,105 | 3/1977 | Holgado | 252/77 |
| 4,010,106 | 3/1977 | Rothert | 252/32.7 E |
| 4,010,107 | 3/1977 | Rothert | 252/32.7 E |
| 4,048,080 | 9/1977 | Lee et al. | 252/51.5 A |
| 4,053,426 | 10/1977 | Davis et al. | 252/34 |
| 4,097,389 | 6/1978 | Andress | 252/51.5 A |
| 4,098,585 | 7/1978 | Vartanian et al. | 44/63 |
| 4,100,083 | 7/1978 | Murphy et al. | 252/34 |
| 4,101,429 | 7/1978 | Birke | 252/32.7 E |
| 4,118,331 | 10/1978 | Jahnke | 252/32.7 E |
| 4,138,346 | 2/1979 | Nassry et al. | 252/32.5 |
| 4,138,419 | 2/1979 | Arakawa et al. | 260/429 R |
| 4,151,099 | 4/1979 | Nassry et al. | 252/32.7 E |
| 4,176,074 | 11/1979 | Coupland et al. | 252/32.7 E |
| 4,185,485 | 1/1980 | Schick et al. | 72/42 |
| 4,212,750 | 7/1980 | Gorman | 252/32.5 |
| 4,225,447 | 9/1980 | Law et al. | 252/34.7 |
| 4,230,588 | 10/1980 | Bonazza et al. | 252/51.5 A |
| 4,234,435 | 11/1980 | Meinhardt et al. | 252/51.5 A |
| 4,253,974 | 3/1981 | Valcho et al. | 252/356 |
| 4,253,975 | 3/1981 | Law et al. | 252/32.7 E |
| 4,257,902 | 3/1981 | Singer | 252/18 |
| 4,329,249 | 5/1982 | Forsberg | 252/34.7 |
| 4,368,133 | 1/1983 | Forsberg | 252/75 |
| 4,419,252 | 12/1983 | Shim | 252/32.7 E |
| 4,435,297 | 3/1984 | Forsberg | 252/34.7 |
| 4,447,348 | 5/1984 | Forsberg | 252/75 |
| 4,448,703 | 5/1984 | Forsberg | 252/75 |
| 4,468,339 | 8/1984 | Rysek et al. | 252/75 |
| 4,486,324 | 12/1984 | Korosec | 252/49.3 |
| 4,609,531 | 9/1986 | Ritschel et al. | 422/13 |
| 4,618,450 | 10/1986 | Higgins | 252/355 |
| 4,670,168 | 6/1987 | Laemmle et al. | 252/42 |

FOREIGN PATENT DOCUMENTS

| | | |
|---|---|---|
| 1020293 | 2/1966 | United Kingdom . |
| 1031130 | 5/1966 | United Kingdom . |
| 1068506 | 5/1967 | United Kingdom . |
| 1098936 | 1/1968 | United Kingdom . |
| 1206059 | 9/1970 | United Kingdom . |
| 1236161 | 6/1971 | United Kingdom . |
| 1254074 | 11/1971 | United Kingdom . |
| 1532836 | 11/1978 | United Kingdom . |
| 2014187 | 8/1979 | United Kingdom . |
| 2031908 | 4/1980 | United Kingdom . |
| WO85/00182 | 1/1985 | WIPO . |
| WO85/03709 | 8/1985 | WIPO . |
| WO86/00081 | 1/1986 | WIPO . |

AQUEOUS COMPOSITIONS CONTAINING NITROGEN-CONTAINING SALTS

Matter enclosed in heavy brackets [ ] appears in the original patent but forms no part of this reissue specification; matter printed in italics indicates the additions made by reissue.

*This is a continuation of application Ser. No. 08/306,862 filed on Sep. 15, 1994, abandoned, which is a continuation of application Ser. No. 08/031,087 filed on Mar. 12, 1993, abandoned, which is a continuation of Ser. No. 07/785,891, filed Oct. 22, 1991, abandoned, which is a continuation of Ser. No. 07/547,910, filed Jul. 3, 1990, abandoned.*

TECHNICAL FIELD

This invention relates to aqueous compositions and, more particularly, to aqueous compositions containing carboxylic salts that are useful as dispersants and/or solubilizers. These aqueous compositions encompass both aqueous concentrates and water-based functional fluids.

BACKGROUND OF THE INVENTION

The term "water-based functional fluid" is used herein to refer to water-based lubricants, hydraulic fluids, cutting fluids and the like. Water-based functional fluids are not a new concept. However, in recent times, political uncertainties affecting many of world's oil supplies has made it increasingly desirable to replace oil-based functional fluids with water-based functional fluids wherever possible. Other benefits can also flow from such replacements such as decreased fire hazard and environmental pollution problems. In many cases, however, it has not been feasible to make such replacements because the water-based functional fluids could not be modified in their properties so as to perform to the same high degree as their oil-based counterparts. For example, it has been often difficult to replace certain oil-based hydraulic fluids with water-based fluids even though the desirability of doing so is evident.

Hydrocarbyl-substituted carboxylic acylating agents having at least 30 aliphatic carbon atoms in the substituent are known. The use of such carboxylic acylating agents as additives in normally liquid fuels and lubricants is discussed in U.S. Pat. Nos. 3,288,714 and 3,346,354. These acylating agents are also useful as intermediates for preparing additives for use in normally liquid fuels and lubricants as described in U.S. Pat. Nos. 2,892,786; 3,087,936; 3,163,603; 3,172,892; 3,189,544; 3,215,707; 3,219,666; 3,231,587; 3,235,503; 3,272,746; 3,306,907; 3,306,908; 3,331,776; 3,341,542; 3,346,354; 3,374,174; 3,379,515; 3,381,022; 3,413,104; 3,450,715; 3,454,607; 3,455,728; 3,476,686; 3,513,095; 3,523,768; 3,630,904; 3,632,511; 3,697,428; 3,755,169; 3,804,763; 3,836,470; 3,862,981; 3,936,480; 3,948,909; 3,950,341; 4,234,435; and 4,471,091; and French Pat. No. 2,223,415.

Nitrogen-containing, phosphorus-free carboxylic solubilizers useful in water based functional fluids are disclosed in U.S. Pat. Nos. 4,329,249; 4,368,133; 4,435,297; 4,447,348; and 4,448,703. These solubilizers are made by reacting (I) at least one carboxylic acid acylating agent having at least one hydrocarbyl substituent of from about 12 to about 500 carbon atoms with (II) at least one (a) N-(hydroxyl-substituted hydrocarbyl) amine, (b) hydroxyl-substituted poly(hydrocarbyloxy) analog of said amine (a), or (c) mixtures of (a) and (b). These patents indicate that preferred acylating agents include the substituted succinic acids or anhydrides, such as polyisobutenyl-substituted succinic anhydride, and that the amines that are useful include the primary, secondary and tertiary alkanol amines, such as diethylethanolamine and mixtures of diethylethanolamine and ethanolamine. These solubilizers are useful in dispersing or dissolving oil-soluble, water-insoluble functional additives in water-based functional fluids.

Departing now from the teachings of these prior patents, it has now been discovered that dispersants and/or solubilizers that are useful in aqueous compositions, such as aqueous concentrates, water-based functional fluids and the like, can be provided by reacting a hydrocarbyl-substituted carboxylic acid or anhydride, or ester or amide derivative of said acid or anhydride, with any amine or an alkali or alkaline earth metal or an alkali or alkaline earth metal compound under salt-forming conditions. The resulting carboxylic salts are particularly useful in dispersing and/or dissolving oil-soluble, water-insoluble functional additives in aqueous concentrates, water-based functional fluids and the like.

SUMMARY OF THE INVENTION

The present invention provides for a composition comprising water and at least one carboxylic salt dispersed or dissolved in said water, said salt being derived from:

(A)(I) at least one hydrocarbyl-substituted carboxylic acid or anhydride, the hydrocarbyl substituent of said acid or anhydride having an average of from about 12 to about 500 carbon atoms, or (II) at least one derivative formed by reacting at least one of said hydrocarbyl-substituted carboxylic acid or anhydride with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydrocarbyl-substituted acid or anhydride simultaneously or sequentially in any order; and (B) at least one amine, alkali or alkaline earth metal, or alkali or alkaline earth metal compound; with the proviso that:

(i) when component (A) is said hydrocarbyl-substituted carboxylic acid or anhydride, component (B) is other than an N-(hydroxyl-substituted hydrocarbyl) amine and/or hydroxyl-substituted poly(hydrocarbyloxy) analog of said N-(hydroxyl-substituted hydrocarbyl) amine; and (ii) when component (A) is the reaction product of said hydrocarbyl-substituted carboxylic acid or anhydride and an N-(hydroxyl-substituted hydrocarbyl) amine and/or hydroxyl-substituted poly(hydrocarbyloxy) analog of said N-(hydroxyl-substituted hydrocarbyl) amine, component (B) is other than an N-(hydroxyl-substituted hydrocarbyl) amine and/or hydroxyl-substituted poly(hydrocarbyloxy) analog of said N-(hydroxyl-substituted hydrocarbyl) amine.

DESCRIPTION OF THE PREFERRED EMBODIMENTS

The term "hydrocarbyl" is used herein to include:

(1) hydrocarbyl groups, that is, aliphatic (e.g., alkyl or alkenyl), alicyclic (e.g., cycloalkyl, cycloalkenyl), aromatic, aliphatic- and alicyclic-substituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three non-hydrocarbon groups or heteroatoms and preferably no more than one, will be present for each 10 carbon atoms in a hydrocarbyl group. Typically, there will be no such groups or heteroatoms in a hydrocarbyl group and it will, therefore, be purely hydrocarbyl.

The hydrocarbyl groups are preferably free from acetylenic unsaturation; ethylenic unsaturation, when present will generally be such that there is no more than one ethylenic linkage present for every 10 carbon-to-carbon bonds. The hydrocarbyl groups are often completely saturated and therefore contain no ethylenic unsaturation.

The term "lower" as used in the present specification and claims, when used in conjunction with terms such as alkyl, alkenyl, alkoxy, and the like, is intended to describe such groups which contain a total of up to 7 carbon atoms.

The Hydrocarbyl-Substituted Carboxylic Acids and Anhydrides

The hydrocarbyl-substituted carboxylic acids and anhydrides that are used in accordance with the present invention are preferably made by reacting one or more alpha-beta olefinically unsaturated carboxyic acid or anhydride reagents containing two to about 20 carbon atoms, exclusive of the carboxyl-based groups, with one or more olefins containing at least about 12 carbon atoms, as described more fully hereinafter.

The alpha-beta olefinically unsaturated carboxylic acids and anhydrides may be either monobasic or polybasic in nature. Exemplary of the monobasic alpha-beta olefinically unsaturated carboxylic acids include the carboxylic acids corresponding to the formula:

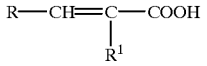

wherein R is hydrogen, or a saturated aliphatic or alicyclic, aryl, alkylaryl or heterocyclic group, preferably hydrogen or a lower alkyl group, and $R_1$ is preferably hydrogen or a lower alkyl group. The total number of carbon atoms in R and $R_1$ should not exceed about 18 carbon atoms. Specific examples of useful monobasic alpha-beta olefinically unsaturated carboxylic acids include acrylic acid; methacrylic acid; cinnamic acid; crotonic acid; 3-phenyl propenoic acid; alpha, beta-decenoic acid, etc. The polybasic acids are preferably dicarboxylic, although tri- and tetracarboxylic acids can be used. Exemplary polybasic acids include maleic acid, fumaric acid, mesaconic acid, itaconic acid and citraconic acid. The alpha-beta olefinically unsaturated carboxylic anhydrides can be the anhydride derivative of any of the foregoing acids. A preferred alpha-beta olefinically unsaturated carboxylic anhydride reagent is maleic anhydride.

In general, the hydrocarbyl substituents present in the hydrocarbyl-substituted carboxylic acids and anhydrides are free from acetylenic unsaturation; ethylenic unsaturation, when present is generally such that there is no more than one ethylenic linkage present for every ten carbon-to-carbon bonds in the substituent. The substituents are often completely saturated and therefore contain no ethylenic unsaturation. These hydrocarbyl substituents have an average of preferably from about 12 to about 500 carbon atoms, more preferably from about 16 to about 500 carbon atoms, more preferably from about 20 to about 500 carbon atoms, more preferably from about 30 to about 500 carbon atoms, more preferably from about 40 to about 500 carbon atoms, more preferably from about 50 to about 500 carbon atoms. These hydrocarbyl substituents are preferably alkyl or alkenyl groups.

These hydrocarbyl substituents are preferably derived from olefin polymers or chlorinated analogs thereof. The olefin monomers from which the olefin polymers are derived are polymerizable olefins and monomers characterized by having one or more ethylenic unsaturated groups. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C{=}CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl substituents may also include aromatic groups (especially phenyl groups and lower alkyl and/or lower alkoxy-substituted phenyl groups such as para (tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about two to about 16 carbon atoms. A more typical class of olefin polymers is selected from that group consisting of homo- and interpolymers of terminal olefins of about two to about six carbon atoms, especially those of about two to about four carbon atoms.

Specific examples of terminal and medial olefin monomers which can be used to prepare the olefin polymers from which the hydrocarbyl substituents are derived include ethylene, propylene, butene-1, butene-2, isobutene, pentene-1, hexene-1, heptene-1, octene-1, nonene-1, docene-1, pentene-2, propylene tetramer, diisobutylene, isobutylene, trimer, butadiene-1,2, butadiene-1,3, pentadiene-1,2, pentadiene-1,3, isoprene, hexadiene-1,5, 2-chlorobutadiene-1,3, 2-methylheptene-1, 3-cyclohexylbutene-1, 3,3-dimethylpentene-1, styrene-divinylbenzene, vinylacetate, allyl alcohol, 1-methyl-vinylacetate, acrylonitrile, ethylacrylate, ethyl-vinylether and methylvinylketone. Of these, the purely hydrocarbyl monomers are preferred and the terminal olefin monomers are especially preferred.

In a particularly advantageous embodiment of the invention, the olefin polymers are poly(isobutene)s such as obtained by polymerization of a $C_4$ refinery stream having a butene content of about 35 to about 75% by weight and an isobutene content of about 30 to about 60% by weight in the presence of a Lewis acid catalyst such as aluminum chloride or boron trifluoride. These polyisobutenes preferably contain predominantly (that is, greater than about 80% of the total repeat units) isobutene repeat units of the configuration.

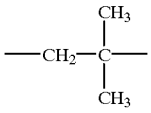

Preferred acids and anhydrides are the hydrocarbyl-substituted succinic acids and anhydrides represented by the formulae:

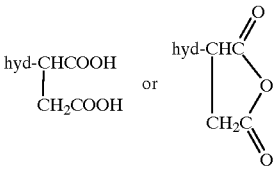

wherein "hyd" is the hydrocarbyl substituent.

The hydrocarbyl-substituted carboxylic acids, and anhydrides can be prepared by any of several known procedures which are described in the following U.S., British and Canadian patents: U.S. Pat. Nos. 3,024,237; 3,087,936; 3,172,892; 3,215,707; 3,219,666; 3,231,587; 3,245,910; 3,254,025; 3,271,310; 3,272,743; 3,272,746; 3,278,550; 3,288,714; 3,307,928; 3,312,619; 3,341,542; 3,367,943; 3,373,111; 3,374,174; 3,381,022; 3,394,179; 3,454,607; 3,346,354; 3,470,098, 3,630,902; 3,652,616; 3,755,169; 3,868,330; 3,912,764; 4,234,435; and 4,368,133. British Pat. Nos. 944,136; 1,085,903; 1,162,436; and 1,440,219. Canadian Pat. No. 956,397. These patents are incorporated herein by reference.

One procedure for preparing the hydrocarbyl-substituted carboxylic acids and anhydrides is illustrated in U.S. Pat. No. 3,219,666. This procedure is conveninently designated as the "two-step procedure". It involves first chlorinating an olefin polymer until there is an average of at least about one chloro group for each molecular weight of olefin polymer. (For purposes of this invention, the molecular weight of the olefin polymer is the weight corresponding to the Mn value.) Chorination involves merely contacting the olefin polymer with chlorine gas until the desired amount of chlorine is incorporated into the chlorinated polyolefin. Chlorination is generally carried out at a temperature of about 75° C. to about 125° C. If a diluent is used in the chlorination procedure, it should be one which is not itself readily subject to further chlorination. Poly- and perchlorinated and/or fluorinated alkanes and benzenes are examples of suitable diluents.

The second step in the two-step chlorination procedure is to react the chlorinated polyolefin with the alpha-beta olefinically unsaturated carboxylic acid reagent at a temperature usually within the range of about 100° C. to about 200° C. The mole ratio of chlorinated polyolefin to carboxylic acid reagent is usually about 1:1. (For purposes of this invention, one mole of a chlorinated polyolefin has the molecular weight of a chlorinated polyolefin corresponding to the Mn value of the unchlorinated polyolefin.) However, a stoichiometric excess of carboxylic acid reagent can be used, for example, a mole ratio of 1:2. If an average of more than about one chloro group per molecule of polyolefin is introduced during the chlorination step, then more than one mole of carboxylic acid reagent can react per mole of chlorinated polyalkene. Because of such situations, it is better to describe the ratio of chlorinated polyolefin to carboxylic acid reagent in terms of equivalents. (An equivalent weight of chlorinated polyolefin, for purposes of this invention, is the weight corresponding to the Mn value divided by the average number of chloror groups per molecule of chlorinated polyolefin. An equivalent weight of a carboxylic acid reagent is its molecular weight.) Thus, the ratio of chlorinated polyolefin to carboxylic acid reagent will normally be such as to provide about one equivalent of carboxylic acid reagent for each mole of chlorinated polyolefin up to about one equivalent of carboxylic acid reagent for each equivalent of chlorinated polyolefin with the understanding that it is normally desirable to provide an excess of carboxylic acid reagent; for example, an excess of about 5% to about 25% by weight. Unreacted excess carboxylic acid reagent may be stripped from the reaction product, usually under vacuum, or reacted during a further stage of the process as explained below.

The resulting polyolefin-substituted carboxylic acid or anhydride is, optionally, again chlorinated if the desired number of carboxylic groups are not present in the product. If there is present, at the time of this subsequent chlorination, any excess carboxylic acid reagent from the second step, the excess will react as additional chlorine is introduced during the subsequent chlorination. Otherwise, additional carboxylic acid reagent is introduced during and/or subsequent to the additional chlorination step. This technique can be repeated until the total number of carboxylic groups per equivalent weight of substituent groups reaches the desired level.

Another procedure for preparing hydrocarbyl-substituted carboxylic acids and anhydrides of the invention utilizes a process described in U.S. Pat. No. 3,912,764 and U.K. Pat. No. 1,440,219. Both of these patents are incorporated herein by reference. According to this procedure, the polyolefin and the carboxylic acid reagent are first reacted by heating them together in a direct alkylation procedure. When the direct alkylation step is completed, chlorine is introduced into the reaction mixture to promote reaction of the remaining unreacted carboxylic acid reagent. According to these patents, from about 0.3 to about 2 or more moles of carboxylic acid reagent are used in the reaction for each mole of olefin polymer. The direct alkylation step is conducted at temperatures of about 180° C. to about 250° C. During the chlorine-introducing stage, a temperature of about 160° C. to about 225° C. is employed.

A preferred process for preparing the hydrocarbyl-substituted carboxylic acids and anhydrides of this invention, is the so-called "one-step" process. This process is described in U.S. Pat. Nos. 3,215,707 and 3,231,587. Both of these patents are incorporated herein by reference. Basically, the one-step process involves preparing a mixture of the polyolefin and the carboxylic acid reagent containing the necessary amounts of both to provide the desired hydrocarbyl-substituted carboxylic acids or derivatives of this invention. Chlorine is then introduced into the mixture, usually by passing chlorine gas through the mixture with agitation, while maintaining the mixture at a temperature of at least about 140° C. A variation on this process involves adding additional carboxylic acid reagent or subsequent to the chlorine introduction. Usually where the polyolefin is sufficiently fluid at 140° C. and above, there is no need to utilize an additional substantially inert, normally liquid solvent/diluent in the one-step process. However, as explained hereinbefore, if a solvent/diluent is employed, it is preferably one that resists chlorination, Again, the poly- and perchlorinated and/or -fluorinated alkanes, cycloalkanes, and benzenes can be used for this purpose.

Chlorine may be introduced continuously or intermittently during the one-step process. The rate of introduction of the chlorine is not critical although, for maximum utilization of the chlorine, the rate should be about the same as the rate of consumption of chlorine in the course of the reaction. When the introduction rate of chlorine exceeds the rate of consumption, chlorine is evolved from the reaction mixture. It is often advantageous to use a closed system, including superatmospheric pressure, in order to prevent loss of chlorine so as to maximize chlorine utilization.

The minimum temperature at which the reaction in the one-step process takes place at a reasonable rate is usually about 140° C. Thus, the minimum temperature at which the process is normally carried out is at about 140° C. A preferred temperature range is between about 160° C. and about 220° C. Higher temperatures such as 250° C. or even higher may be used but usually with little advantage. In fact, temperatures in excess of 220° C. are often disadvantageous because they tend to "crack" the polyolefins (that is, reduce their molecular weight by thermal degradation) and/or decompose the carboxylic acid reagent. For this reason, maximum temperatures of about 200° C. to about 210° C. are normally not exceeded. The upper limit of the useful temperature in the onestep process is determined primarily by the decomposition point of the components in the reaction mixture including the reactants and the desired products. The decomposition point is that temperature at which there is sufficient decomposition of any reactant or product such as to interfere with the production of the desired products.

In the one-step process, the molar ratio of carboxylic acid reagent to chlorine is such that there is at least about one mole of chlorine for each mole of carboxylic acid reagent to be incorporated into the product. Moreover, for practical reasons, a slight excess, usually in the neighborhood of about 5% to about 30% by weight of chlorine, is utilized in order to offset any loss of chlorine from the reaction mixture. Larger amounts of excess chlorine may be used but do not appear to produce any beneficial results.

The Alcohols (b) Useful In Making the Derivative (A) (II)

The alcohols that can be used as (b) can be aliphatic, cycloaliphatic, aromatic, or heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols.

These alcohols include those compounds of the general formula:

$$R_1—(OH)_m$$

wherein $R_1$ is a monovalent or polyvalent organic group joined to the —OH groups through carbon-to-oxygen bonds (that is, —COH wherein the carbon is not part of a carbonyl group) and m is an integer of from 1 to about 10, preferably 2 to about 6. Except for the polyoxyalkylene alcohols, the mono- and polyhydric alcohols corresponding to the formula $R_1—(OH)_m$ preferably contain not more than 40 carbon atoms, more preferably not more than about 20 carbon atoms. The alcohols may contain non-hydrocarbon substituents to groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as $—CH_2CH_2—X—CH_2CH_2—$ where X is —O— or —S—).

Among the polyoxyalkylene alcohols that can be used are the commercially available polyoxyalkylene alcohols and derivatives thereof that include the polyoxyethylated amines, amides, and quaternary salts available from Armour Industrial Chemical Co. under the names ETHODUOMEEN polyethoxylated high-molecular-weight aliphatic diamines; ETHOMEEN, polyethoxylated alipathic amines containing alkyl groups in the range of about 8 to about 18 carbon atoms; ETHOMID, polyethoxylated high-molecular-weight amides; and ETHOQUAD, polyethoxylated quaternary ammonium chlorides derived from longchain amines.

Useful polyoxyalkylene alcohols and derivatives thereof include the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about 40 carbon atoms. Specific hydrocarbyl groups include methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about 20 carbon atoms. Members of this class of alcohols are commercially available from various sources; e.g., PLURONICS, polyols available from Wyandotte Chemicals Corporation; POLYGLYCOL 112-2, a liquid triol derived from ethyleneoxide and propyleneoxide available from Dow Chemical Co.; and TERGITOLS, dodecylphenyl or nonylphenyl polyethylene glycol ethers, and UCONs, polyalkylene glycols and various derivatives thereof, both available from Union Carbide Corporation. However, the alcohols used must have an average of at least one free alcoholic hydroxyl group per molecule of polyoxyalkylene alcohol. For purposes of describing these polyoxyalkylene alcohols, an alcoholic hydroxyl group is one attached to a carbon atom that does not form part of an aromatic nucleus.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least one such OH group. However, the remaining OH group can be esterified with a monobasic, aliphatic or aromatic carboxylic acid of up to about 20 carbon atoms such as acetic acid, propionic acid, oleic acid, stearic acid, benzoic acid, and the like. The monoethers of these alkylene glycols and polyoxyalkylene glycols are also useful. These include the monoaryl ethers, monoalkyl ethers, and monoaralkyl ethers of these alkylene glycols and polyoxyalkylene glycols. This group of alcohols can be represented by the formula $$HO-(R_AO)_pR_B-OR_C$$

wherein $R_A$ and $R_B$ are independently alkylene groups of from about 2 to 8 carbon atoms; and $R_C$ is aryl (e.g., phenyl), lower alkoxy phenyl, or lower alkyl phenyl, or lower alkyl (e.g., ethyl, propyl, terbutyl, pentyl, etc.); and aralkyl (e.g., benzyl, phenylethyl, phenylpropyl, p-ethylphenylethyl, etc.); p is from zero to about eight, preferably from about 2 to 4. Polyoxyalkylene glycols where the alkylene groups are ethylene or propylene and p is at least two as well as the monoethers thereof as described above are useful.

The monohydric and polyhydric alcohols useful in this invention include monohydroxy and polyhydroxy aromatic compounds. Monohydric and polyhydric phenols and naphthols are preferably hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 1 to about 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxy-biphenyl, hydroquinone, pyrogallol, phloroglucinol, hexylresorcinol, orcin, quaiacol, 2-chlorophenol, 2,4-dibutylphenol, propenetetramer-substituted phenol, didodecylphenol, 4,4'-methylene-bis-methylene-bis-phenol, alpha-decyl-betanaphthol, polyisobutenyl-(molecular weight of about 1000)-substituted phenol, the condensation product of heptylphenol with about 0.5 mole of formaldehyde, the condensation product of octylphenol with acetone, di(hydroxyphenyl)oxide, di-(hydroxyphenyl)-sulfide, di(hydroxyphenyl)-disulfide, and 4-cyclohexylphenol. Phenol itself and aliphatic hydrocarbon-substituted phenols, e.g., alkylated phenols having up to 3 aliphatic hydrocarbon substituents are useful. Each of the aliphatic hydrocarbon substituents may contain about 100 or more carbon atoms but usually will have from 1 to about 20 carbons atoms. Alkyl and alkenyl groups are the preferred aliphatic hydrocarbon substituents.

Further specific examples of monohydric alcohols which can be used include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tertbutyl alcohol, 5-bromo-dodecanol, nitro-octadecanol, and dioleate of glycerol. Alcohols useful in this invention may be unsaturated alcohols such as allyl alcohol, cinnamyl alcohol, 1-cyclohexene-3-ol and oleyl alcohol.

Other specific alcohols useful in this invention are the ether alcohols and amino alcohols including, for example, the oxyalkylene-, oxyarylene-, amino-alkylene-, and amino-arylene-substituted alcohols having one or more oxyalkylene, aminoalkylene or aminoaryleneoxy-arylene groups. These alcohols are exemplified by the Cellosolves, (products of Union Carbide identified as mono- and dialkyl ethers of ethylene glycol and their derivatives), the Carbitols (products of Union Carbide identified as mono- and dialkyl ethers of diethylene glycol and their derivatives), phenoxyethanol, heptylphenyl-(oxypropylene) 6-OH octyl-(oxyethylene)30-OH, phenyl-(oxyoctylene)2-OH, mono-(heptylphenyloxypropylene)-substituted glycerol, poly (styreneoxide), aminoethanol, 3-aminoethylpentanol, di(hydroxyethyl)amine, p-aminophenol, tri(hydroxpropyl) amine, N-hydroxyethyl, ethylenediamine, N,N,N',N'-tetrahydroxytrimethylenediamine, and the like.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glycose, fructose, sucrose, rhamose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful. Further specific examples of such partially esterified polyhydric alcohols are the monooleate of sorbitol, distearate of sorbitol, monooleate of glycerol, monostearate of glycerol, di-dodecanoate of erythritol, and the like.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like. Aliphatic alcohols containing at least about 3 hydroxy groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sortibol, 2-hydroxymethyl-2-methyl-1,3-propanediol-(trimethylolethane), 2-hydroxymethyl-2-ethyl-1,3-propanediol (trimethylopropane), 1,2,4-hexanetriol, and the like.

The hydrocarbyl-substituted carboxylic acids or anhydrides are preferably reacted with the alcohols (b) according to conventional esterification techniques. This normally involves heating the acid or anhydride with the alcohol, optionally in the presence of a normally liquid, substantially inert, organic liquid solvent/diluent and/or in the presence of esterification catalyst. Temperatures of at least about 30° C. up to the decomposition temperature of the reaction component and/or product having the lowest such temperature can be used. This temperature is preferably in the range of about 50° C. to about 130° C., more preferably about 80° C.

to about 100° C. when a carboxylic anhydride is used as the carboxylic reactant. On the other hand, when the carboxylic reactant is an acid, the temperature is preferably in the range of about 100° C. up to about 300° C. with temperatures of about 140° C. to 250° C. often being employed. Usually, about 0.05 to about 0.95 equivalent of alcohol are used for each equivalent of acid or anhydride. Preferably, about 0.5 equivalent of alcohol per equivalent of acid or anhydride is employed. An equivalent an of alcohol is its molecular weight divided by the total number of hydroxyl groups present in the molecule. Thus, an equivalent weight of ethanol is its molecular weight while the equivalent weight of ethylene glycol is one-half its molecular weight. The number of equivalents of the acid or anhydride depends on the total number of carboxylic functions (e.g., carboxylic acid or carboxylic anhydride groups) present in the acid or anhydride. Thus, the number of equivalents of the acid or anhydride will vary with the number of carboxy groups present therein. In determining the number of equivalents of the acid or anhydride, those carboxyl functions which are not capable of reacting as a carboxylic acid acylating agent are excluded. In general, however, there is one equivalent of acid or anhydride for each carboxy group in the acid or anhydride. For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of acid or anhydride available to react with the alcohol (b) can be readily determined by one skilled in the art.

Many issued patents disclose procedures for reacting carboxylic acid acylating agents with alcohols to produce acidic esters and neutral esters. These same techniques are applicable in preparing the derivatives (A) (II) of this invention from the hydrocarbyl-substituted carboxylic acids or anhydrides and alcohols described above. The following U.S. Patents are expressly incorporated herein by reference: U.S. Pat. Nos. 3,331,776; 3,381,022; 3,522,179; 3,542,680; 3,697,428; and 3,755,169.

The Primary Amines (c) and Secondary Amines (d) Useful in Making the Derivative (A) (II)

The primary amines (c) are characterized by the presence within their structure of at least —$NH_2$ group. The secondary amines (d) are characterized by at least one >NH group. These amines can be monoamines or polyamines. Mixtures of two or more of these can be used.

The amines (c) and (d) can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. The amines may also contain non-hydrocarbon substituents or groups as long as these groups do not significantly interfere with the reaction of the amines with the hydrocarbyl-substituted carboxylic acids or anhydrides. Such non-hydrocarbon substituents or groups include lower alkoxy, lower alkyl, mercapto, nitro, and interrupting groups such as —O— and —S— (e.g., as in such groups as —$CH_2CH_2$—X—$CH_2CH_2$— where X is —O— or —S—).

With the exception of the polyalkylene polyamines, branched polyalkylene polyamines, polyoxyalkylene polyamines and high molecular weight hydrocarbyl-substituted amines described more fully hereinafter, the primary amines (c) and secondary amines (d) ordinarily contain less than about 40 carbon atoms in total and usually not more than about 20 carbon atoms in total.

Aliphatic monoamines include mono-aliphatic and di-aliphatic-substituted amines wherein the aliphatic groups can be saturated or unsaturated and straight or branched chain. Thus, they are primary or secondary aliphatic amines. Such amines include, for example, mono- and di-alkyl-substituted amines, mono- and di-alkenyl-substituted amines, and amines having one N-alkenyl substituent and one N-alkyl substituent, and the like. The total number of carbon atoms in these aliphatic monoamines preferably does not exceed about 40 and usually does not exceed about 20 carbon atoms. Specific examples of such monoamines include ethylamine, di-ethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)ethylamine, benzylamine, phenylethylamine, and 3-(furylpropyl) amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(para-methylphenyl) amine, naphthylamine, N-(n-butyl) aniline, and the like. Examples of aliphatic-substituted, cycloaliphatic-substituted, and heterocyclic-substituted aromatic monoamines include para-ethoxyaniline, paradodecylamine, cyclohexyl-substituted naphthylamine and thienyl-substituted aniline.

Suitable polyamines include aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamine, N-N'-di-n-butyl-para-phenylene diamine, bis-(para-aminophenyl)-methane, 1,4-diaminocyclohexane, and the like.

Heterocyclic mono- and polyamines can also be used. As used herein the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The 5- and 6-membered heterocyclic rings are preferred.

Among the suitable heterocyclics are aziridines, azetidines, azolidines, tetra- and di-hydro pyridines, pyrroles, indoles, piperadines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra, di- and perhydro-derivatives of each of the above and mixtures of two or more than these heterocyclic amines. Preferred heterocyclic amines are the saturated 5- or 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Also suitable as amines are the aminosulfonic acids and derivatives thereof corresponding to the formula:

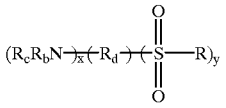

wherein R is OH, $NH_2$, $ONH_4$, etc.; $R_a$ is a polyvalent organic group having a valence equal to x+y; $R_b$ and $R_c$ are each independently hydrogen, hydrocarbyl or substituted hydrocarbyl with the proviso that at least one of $R_b$ and $R_c$ is hydrogen per aminosulfonic acid molecule; x and y are each integers equal to or greater than one. Each aminosulfonic reactant is characterized by at least one NH< or $H_2N$— group and at least one

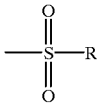

group. These sulfonic acids can be aliphatic, cycloaliphatic or aromatic aminosulfonic acids and the corresponding functional derivatives of the sulfo group. Specifically, the aminosulfonic acids can be aromatic aminosulfonic acids, that is, where $R_a$ is a polyvalent aromatic group such as phenylene where at least one

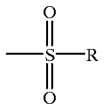

group is attached directly to a nuclear carbon atom of the aromatic group. The aminosulfonic acid may also be a mono-amino aliphatic sulfonic acid; that is, an acid where x is one and $R_a$ is a polyvalent aliphatic group such as ethylene, propylene, trimethylene, and 2-methylene propylene. Other suitable aminosulfonic acids and derivatives thereof useful as amines in this invention are disclosed in U.S. Pat. Nos. 3,029,250; 3,367,864; and 3,926,820; which are incorporated herein by reference.

Hydrazine and substituted-hydrazine can also be used. At least one of the nitrogens in the hydrazine must contain a hydrogen directly bonded thereto. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methylhydrazine, N,N'-di-(para-chlorophenol)-hydrazine, N-phenyl-N'-cyclohexylhydrazine, and the like.

The high molecular weight hydrocarbyl amines, both monoamines and polyamines, which can be used are generally prepared by reacting a chlorinated polyolefin having a molecular weight of at least about 400 with ammonia or an amine. The amines that can be used are known in the art and described, for example, in U.S. Pat. Nos. 3,275,554 and 3,438,757, both of which are incorporated herein by reference. These amines must possess at least one primary or secondary amino group.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

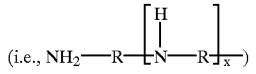

group per nine amino units present on the main chain; for example, 1–4 of such branched chains per nine units on the main chain, but preferably one side chain unit per nine main chain units. Thus, these polyamines contain at least three primary amino groups and at least one tertiary amino group. These amines may be expressed by the formula:

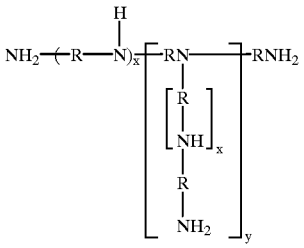

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

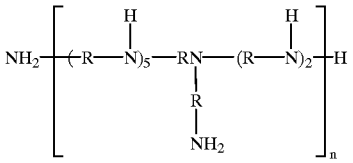

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

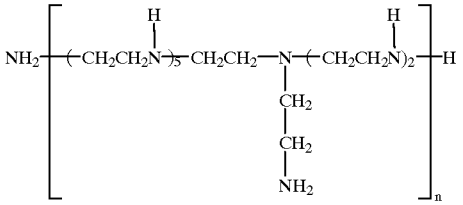

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable amines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amine represented by the formula:

$$NH_2\text{—Alkylene—O—Alkylene—}_m NH_2$$

wherein m has a value of from about 3 to about 70, preferably from about 10 to about 35; and the formula:

$$R\text{—Alkylene—O—Alkylene—}_n NH_2]3\text{–}6$$

wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

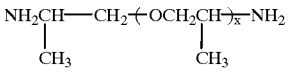

wherein x has a value of from about 3 to about 70, preferably from about 10 to 35; and

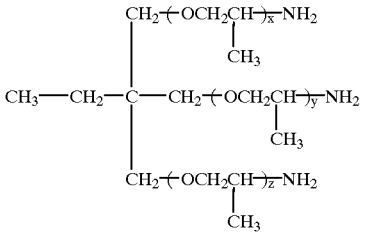

wherein x+y+z have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Jefferson Chemical Company, Inc. under the trade name "Jeffamine". U.S. Pat. Nos. 3,804,763 and 3,948,800 are incorporated herein by reference for their disclosure of such polyoxyalkylene polyamines.

Useful amines are the alkylene polyamines, including the polyalkylene polyamines, as described in more detail hereafter. The alkylene polyamines include those conforming to the formula:

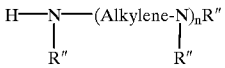

wherein n is from 1 to about 10; each R" is independently a hydrogen atom, a hydrocarbyl group or a hydroxy-substituted hydrocarbyl group having up to about 30 carbon atoms, and the "Alkylene" group has from about 1 to about 10 carbon atoms with the preferred alkylene being ethylene or propylene. Useful are the alkylene polyamines wherein each R" is hydrogen with the ethylene polyamines, and mixtures of ethylene polyamines being particularly preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene)

triamine, tripropylene tetramine, tetraethylene pentamine, trimethylene diamine, pentaethylene hexamine, di(trimethylene) triamine, N-(2-aminoethyl) piperazine, 1,4-bis(2-aminoethyl) piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines, Aliphatic" in The Encyclopedia of Chemical Technology, Third Edition, Kirk Othmer, Volume 7, pages 580–602, A Wiley Interscience Publication, John Wiley and Sons, 1979, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

The hydrocarbyl-substituted carboxylic acids or anhydrides are preferably reacted with the ammonia (a), primary amine (c) or secondary amine (d) under amide forming conditions to form the derivative (A) (II) by mixing together one or more of the said acid or anhydride and one or more of said ammonia, primary amine and/or secondary amine, optionally in the presence of a normally liquid, substantially inert organic liquid solvent/diluent, and heating the mixture at temperatures in the range of from about 30° C. up to the decomposition temperature of the reaction component and/or product having the lowest such temperature. This temperature is preferably in the range of about 50° C. to about 130° C., more preferably about 80° C. to about 100° C. when the carboxylic reactant is an anhydride. On the other hand, when the carboxylic reactant is an acid, the temperature is preferably in the range of about 100° C. to about 300° C., more preferably from about 125° C. to about 250° C. The acid or anhydride and the ammonia are preferably reacted in amounts sufficient to provide from about 0.05 to about 0.95, preferably about 0.5 mole of ammonia per equivalent of acid or anhydride. The acid or anhydride and the amine are preferably reacted in amounts sufficient to provide from about 0.05 to about 0.95, preferably about 0.5 equivalent of amine per equivalent of the acid or anhydride. For purposes of this reaction, an equivalent of an amine is its molecular weight divided by the total number of >NH and —$NH_2$ groups present in the molecule. Thus, ethylene diamine has an equivalent weight equal to one-half its molecular weight; and amino guanidine has an equivalent weight equal to one-fourth its molecular weight. An equivalent of acid or anhydride is the same as discussed above with respect to reaction with alcohols.

Hydroxyamines (e) Useful in Making the Derivative (A) (II)

The hydroxyamines (e) can be primary, secondary or tertiary amines. The terms "hydroxyamine" and "aminoalcohol" describe the same class of compounds and, therefore, can be used interchangeably.

Typically, the hydroxyamines are primary, secondary or tertiary alkanol amines or mixtures thereof. Such amines can be represented, respectively, by the formulae:

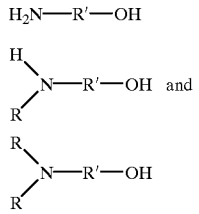

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through the heteroatom (e.g., oxygen, nitrogen or sulfur) to form a 5-, 6-, 7- or 8-membered ring structure. Examples of such heterocyclic amines include n-(hydroxyl lower alkyl)-morpholines, -thiomorpholines, -piperidines, -oxazolidines, -thiazolidines and the like. Typically, however, each R is a lower alkyl group of up to seven carbon atoms.

The hydroxyamines can also be an ether N-(hydroxy-substituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

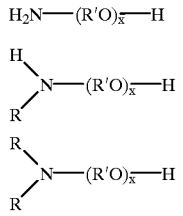

wherein x is a number from about 2 to about 15 and R and R' are as described above.

Polyamine analogs of these hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures are carrying out such reactions are known to those skilled in the art.

Specific examples of alkoxylated alkylene polyamines include N-(2-hydroxyethyl)ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanies by removal of water. Mixtures of two or more of any of the aforesaid mono- or polyamines are also useful.

Examples of the N-(hydroxyl-substituted hydrocarbyl) amines include mono-, di-, and triethanol amine, diethylethanol amine, di-(3-hydroxyl propyl)amine, N-(3-hydroxyl butyl)amine, N-(4-hydroxyl butyl)amine, N,N-di-(2-hydroxyl propyl)amine, N-(2-hydroxyl ethyl)morpholine and its thio analog, N-(2-hydroxyl ethyl)cyclohexyl amine, N-3-hydroxyl cyclopentyl amine, o-, m, and p-aminophenol, N-(hydroxyl ethyl)piperazine, N,N'-di(hydroxyl ethyl) piperazine, and the like.

Further hydroxyamines are the hydroxy-substituted primary amines described in U.S. Pat. No. 3,576,743 by the general formula $$R_a—NH_2$$

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a—NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-3-ethyl-1,3-propanediol, N-(beta-hydroxypropyl)-N'-(beta-aminoethyl)-piperazine, tris-(hydroxymethyl)amino methane (also known as trismethylolamino methane), 2-amino-1-butanol, ethanolamine, beta-(beta-hydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4-(2-hydroxyethyl)piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylolaminomethane and the like. U.S. Pat. No. 3,576,743 is incorporated herein by reference.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N-bis(2-hydroxyethyl)ethylene diamine, 1-(2-hydroxyethyl)-piperazine, monohydroxypropyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxy alkylene polyamines through amino groups or through hydroxy groups are likewise useful. Condensation through amino groups results in a higher amine accompanies by removal of ammonia and condensation through the hydroxy groups results in products containing ether linkages accompanied by removal of water.

The hydrocarbyl-substituted carboxylic acids or anhydrides can be reacted with the hydroxyamine (e) according to conventional ester- and/or amide-forming techniques. This normally involves heating the acid or anhydride with the hydroxyamine, optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., preferably about 80° C. to about 100° C. when the carboxylic reactant is an anhydride. On the other hand, when the carboxylic reactant is an acid, this temperature is preferably in the range of about 100° C. up to about 300° C. with temperatures in the range of about 125° C. to about 250° C. often being employed. Usually, about 0.05 to about 0.95, preferably about 0.5 equivalent of hydroxyamine are used for each equivalent of acid or anhydride. For purposes of this reaction, an equivalent of a hydroxyamine is its molecular weight divided by the total number of —OH, >NH and $—NH_2$ groups present in the molecule. Thus, diethylethanolamine has an equivalent weight equal to its molecular weight; ethanolamine has an equivalent weight equal to one-half its molecular weight. An equivalent of acid or anhydride is the same as discussed above with respect to reaction with alcohols.

Component (B)

The amines useful as component (B) in preparing the carboxylic salts of the invention include ammonia, and the primary amines, secondary amines and hydroxyamines discussed above as being useful in preparing the derivative (A)(II). In addition to ammonia, the primary amines, secondary amines and hydroxyamines discussed above, the amines useful as component (B) also include tertiary amines. The tertiary amines are analogous to the primary amines, secondary amines and hydroxyamines discussed above with the exception that hydrogen atoms in the H—N< or $—NH_2$ groups are replaced by hydrocarbyl groups. These tertiary amines can be monoamines or polyamines.

The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation. The tertiary amines may also contain non-hydrocarbon substituents or groups as long as these groups do not significantly interfere with the reaction of component (B) with component (A). Such non-hydrocarbon substituents or groups include lower alkoxy, lower alkyl, mercapto, nitro, and interrupting groups such as —O— and —S— (e.g., as in such groups as $—CH_2CH_2—X—CH_2CH_2—$ where X is —O— or —S—).

The monoamines can be represented by the formula

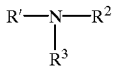

wherein R', $R^2$ and $R^3$ are the same or different hydrocarbyl groups. Preferably, R', $R^2$ and $R^3$ are independently hydrocarbyl groups of from 1 to about 20 carbon atoms.

Examples of useful tertiary amines include trimethyl amine, triethyl amine, tripropyl amine, tributyl amine, monomethyldiethylamine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethylphenyl amine, N,N-dioctyl-1-octanamine, N,N-didodecyl-1-dodecanamine tricoco amine, trihydrogenated-tallow amine, N-methyl-dihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcocoamine, N,N-dimethylsoyaamine, N,N-dimethylhydrogenated tallow amine, etc.

The alkali and alkaline earth metals that are useful as component (B) can be any alkali or alkaline earth metal. The alkali metals are preferred. Sodium and potassium are particularly preferred.

The alkali and alkaline earth metal compounds that are useful include, for example, the oxides, hydroxides and carbonates. Sodium hydroxide and potassium hydroxide are particularly preferred.

Reaction Between Components (A) and (B)

The reaction between components (A) and (B) is carried out under salt forming conditions using conventional techniques. Typically, one or more of components (A) and one or more of components (B) are mixed together and heated to a temperature in the range of about 20° C. up to the decomposition temperature of the reaction component and/or product having the lowest such temperature, preferably about 50° C. to about 130° C., more preferably about 80° C. to about 110° C.; optionally, in the presence of a normally liquid, substantially inert organic liquid solvent/diluent, until the desired product has formed. Components (A) and (B) are preferably reacted in amounts sufficient to provide from about 0.1 equivalent of component (B) per equivalent of component (A) up to an excess of component (B), preferably from about 0.1 to about 2 equivalents of component (B) per equivalent of component (A), more preferably about 1 equivalent of component (B) per equivalent of component (A). For purposes of this reaction, an equivalent of component (A) in the acid or anhydride form, i.e., component (A)(I), is the same as discussed above with respect to the reaction of the acids and anhydrides with alcohols. The number of equivalents of component (A) in the derivative form, i.e., component (A)(II), depends on the total number of carboxy groups present that are capable of reacting as a carboxylic acid acylating agent; that is the number of carboxy groups present that are capable of forming a carboxylic salt with component (B). For example, there would be one equivalent in an acid/amide derived from one mole of a polyisobutylene-substituted succinic anhydride and one mole of ammonia. Similarly, there would be one equivalent in an acid/ester derived from one mole of a polyisobutylene-substituted succinic anhydride and methanol. When component (B) is an amine, an equivalent thereof is its molecular weight divided by the total number of nitrogens present in the molecule that are sufficiently basic to form a salt with component (A). These include, for example, the nitrogen atoms of primary aliphatic amines, secondary aliphatic amines and tertiary aliphatic amines as well as amines bearing one aryl group on the nitrogen atom (e.g., aniline). On the other hand, these do not include, for example, amides, (i.e., 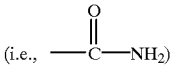 )

or imides (i.e., 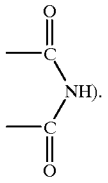 ).

Thus, octylamine has an equivalent weight equal to its molecular weight; ethylene diamine has an equivalent weight equal to one-half of its molecular weight; both ethanolamine and diethylethanolamine have equivalent weights equal to their molecular weights. The equivalent weight of a commercially available mixture of polyalkylene polyamines can be determined by dividing the atomic weight of nitrogen (14) by the % N contained in the polyamine; thus, a polyalkylene polyamine mixture having a % N of 34 would have an equivalent weight of 41.2. When component (B) is an alkali or alkaline earth metal, an equivalent thereof is its molecular weight. When component (B) is an alkali or alkaline earth metal compound, an equivalent thereof is its molecular weight divided by the number of alkali or alkaline earth metal atoms present in the molecule.

The product of the reaction between components (A) and (B) must contain at least some carboxylic salt in order for said product to be effective as a dispersant/solubilizer in accordance with this invention. Thus, this product is typically constituted of a composition containing at least one compound having at least one carboxylic salt linkage (i.e.,

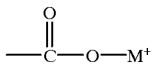

wherein $M^+$ is a metal, ammonium or amine cation) within its molecular structure. This product can also include other compounds such as amides, esters, and the like. Preferably, this product contains compounds containing such salt linkage at a level of at least about 15 mole percent of the product, more preferably at least about 20 mole percent, more preferably at least about 35 mole percent and still more preferably at least about 50 mole percent.

The following examples disclose exemplary preparations of carboxylic salts of the invention. Unless otherwise indicated, in the following examples as well as throughout the entire specification and in the appended claims, all parts and percentages are by weight, and all temperatures are in degrees centigrade.

EXAMPLE 1

2240 parts of polyisobutylene (number average molecular weight=950) substituted succinic anhydride are heated to a temperature in the range of 110°–116° C. 174 parts of morpholine are then added dropwise to the anhydride. After completion of the addition of morpholine, the resulting mixture is maintained at a temperature of 116°–126° C. for two hours. 234 parts of diethylethanolamine are then added dropwise while the temperature is maintained at 116°–126° C. After completion of the addition of diethylethanolamine, the resulting mixture is maintained at 116°–126° C. for 50 minutes with stirring. The resulting product is an amide/salt.

EXAMPLE 2

A mixture of 1100 parts of the polyisobutylene-substituted succinic anhydride used in Example 1 and 100 parts of Carbowax 200 (a product of Union Carbide identified as a polyethylene glycol having a molecular weight of 200) are heated to and then maintained at a temperature of 123°–134° C., maintained at same temperature for 2 hours, then cooled to 100° C. 117 parts of diethylethanolamine are added to the resulting product over a 0.2 hour period while maintaining the temperature at 100° C. The mixture is then cooled to room temperature. The product is an ester/salt.

EXAMPLE 3

A mixture of 1100 parts of the polyisobutylene-substituted succinic anhydride used in Example 1 and 34 parts of pentaerythritol are heated to a temperature of 125°–160° C., maintained at said temperature for 4 hours, then adjusted to 130° C. 117 parts of diethylethanolamine are added to the mixture. The temperature is maintained at 100°–130° C. for 1 hour. The resulting product is then cooled to room temperature. The product is an ester/salt.

EXAMPLE 4

A mixture of 2240 parts of the polyisobutylene-substituted succinic anhydride used in Example 1 and 62 parts of ethylene glycol are heated to a temperature in the range of 116°–120° C., then maintained at said temperature for 5 hours. The temperature of the mixture is then increased to a temperature in the range of 138°–146° C. and maintained at said increased temperature for an additional 4.5 hours. The temperature of the mixture is then decreased to 115° C. over a period of 0.5 hour. 122 parts of monoethanolamine are added to the mixture over a period of 0.5 hour while maintaining the temperature at 115°–120° C. The mixture is then stirred for an additional 0.5 hour while maintaining the temperature at 115°–120° C. The resulting product is an ester/salt.

EXAMPLE 5

A mixture of 917 parts of diluent oil, 40 parts of diatomaceous earth filter aid, 10 parts of caustic soda, 0.2 part of a silicone-based anti-foam agent, 135 parts of 3-amino-1,2,4-triazole, and 6.67 parts of a commercial polyethylene polyamine mixture containing 33.5% nitrogen and substantially corresponding to tetraethylene pentamine are heated to a temperature of 121° C. with stirring. 1000 parts of the polyisobutylene-substituted succinic anhydride used in Example 1 are slowly added to the mixture over a period of about one hour, and during such addition the temperature of the mixture is increased from 121° C. to 154° C. The mixture is then maintained at a temperature of 154°–160° C. with nitrogen blowing for 12 hours. The mixture is then cooled to 138°–149° C. and filtered. A final oil adjustment is made to adjust the product to a 45% by weight diluent oil.

EXAMPLE 6

A mixture of 2644 parts of the polyisobutylenesubstituted succinic anhydride used in Example 1 and 75 parts of ethylene glycol are heated to a temperature of 120° C., and maintained at said temperature for 4 hours. The temperature of the mixture is then increased to 160°–170° C., maintained at said temperature for 2 hours, then reduced to 120° C. 281 parts of diethylethanolamine are added to the mixture over a 15-minute period. The temperature of the mixture is maintained at 115°–120° C. for 1 hour. The mixture is then cooled to room temperature to provide the desired product.

EXAMPLE 7

A mixture of 2240 parts of the polyisobutylenesubstituted succinic anhydride used in Example 1 and 86 parts of piperazine are heated to a temperature of 116°–126° C. and maintained at said temperature for 2 hours. 234 parts of diethylethanolamine are added dropwise to the mixture. The temperature is maintained at 116°–126° C. for 50 minutes. The resulting product is then cooled to room temperature.

Aqueous Compositions

The invention includes aqueous compositions characterized by an aqueous phase with the carboxylic salts of the invention dispersed or dissolved in said aqueous phase. Preferably, this aqueous phase is a continuous aqueous phase, although in some embodiments the aqueous phase can be a discontinuous phase. These aqueous compositions usually contain at least about 25% by weight water. Such aqueous compositions encompass both concentrates containing about 25% to about 90% by weight, preferably from about 40% to about 65% water; and water-based functional fluids containing generally over about 80% by weight of water. The concentrates generally contain from about 5% to about 75% by weight of the carboxylic salts of the invention. The waterbased functional fluids generally contain from about 0.05% to about 15% by weight of said carboxylic salts. The concentrates generally contain less than about 50% hydrocarbon oil. The water-based functional fluids generally contain less than about 15%, preferably less than about 5% hydrocarbon oil.

These concentrates and water-based functional fluids can optionally include other conventional additives commonly employed in water-based functional fluids. These other additives include surfactants; thickeners; oil-soluble, water-insoluble functional additives such as anti-wear agents, extreme pressure agents, dispersants, etc.; and supplemental additives such as corrosion-inhibitors, shear stabilizing agents, bactericides, dyes, water-softeners, odor masking agents, anti-foam agents and the like.

The concentrates are analogous to the water-based functional fluids except that they contain less water and proportionately more of the other ingredients. The concentrates can be converted to water-based functional fluids by dilution with water. This dilution is usually done by standard mixing techniques. This is often a convenient procedure since the concentrate can be shipped to the point of use before additional water is added. Thus, the cost of shipping a substantial amount of the water in the final water-based functional fluid is saved. Only the water necessary to formulate the concentrate (which is determined primarily by ease of handling and convenience factors), need be shipped.

Generally these water-based functional fluids are made by diluting the concentrates with water, wherein the ratio of water to concentrate is usually in the range of about 80:20 to about 99:1 by weight. As can be seen when dilution is carried out within these ranges, the final water-based functional fluid contains, at most, an insignificant amount of hydrocarbon oil.

In various preferred embodiments of the invention, the water-based functional fluids are in the form of solutions while in other embodiments they are in the form of micelle dispersions or microemulsions which appear to be true solutions. Whether a solution, micelle dispersion or microemulsion is formed is dependent, inter alia, on the particular components employed.

Also included within the invention are methods for preparing aqueous compositions, including both concentrates and water-based functional fluids, containing other conventional additives commonly employed in water-based functional fluids. These methods comprise the steps of:

(1) mixing the carboxylic salts of the invention with such other conventional additives either simultaneously or sequentially to form a dispersion or solution; optionally (2) combining said dispersion or solution with water to form said aqueous concentrate; and/or (3) diluting said dispersion or solution, or concentrate with water wherein the total amount of water used is in the amount required to provide the desired concentration of the carboxylic salts of the invention and other functional additives in said concentrates or said water-based functional fluids.

These mixing steps are preferably carried out using conventional equipment and generally at room or slightly elevated temperatures, usually below 100° C. and often below 50° C. As noted above, the concentrate can be formed and then shipped to the point of use where it is diluted with water to form the desired water-based functional fluid. In other instances the finished water-based functional fluid can be formed directly in the same equipment used to form the concentrate or the dispersion or solution.

Surfactants

The surfactants that are useful in the aqueous compositions of the invention can be of the actionic, anionic, nonionic or amphoteric type. Many such surfactants of each type are known to the art. See, for example, McCutcheon's "Emulsifiers & Detergents", 1983, North American Edition, pp. 61–299, and International Edition, pp. 1–255, published by McCutcheon Division, MC Publishing Co., Glen Rock, N.J. U.S.A.; these pages being incorporated herein by reference.

Among the nonionic surfactant types are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the present invention are the alkylene oxide-treated alkyl phenols such as the ethylene oxide alkyl phenol condensates sold by the Rohm & Haas Company. A specific example of these is Triton X-100 which contains an average of 9–10 ethylene oxide units per molecule, has an HLB value of about 13.5 and a molecular weight of about 628. Many other suitable nonionic surfactants are known; see, for example, the aforementioned McCutcheon's as well as the treatise "Non-Ionic Surfactants" edited by Martin J. Schick, M. Dekker Co., New York, 1967, which is herein incorporated by reference for its disclosures in this regard.

As noted above, cationic, anionic and amphoteric surfactants can also be used. Generally, these are all hydrophilic surfactants. Anionic surfactants contain negatively charged polar groups while cationic surfactants contain positively charged polar groups. Amphoteric dispersants contain both types of polar groups in the same molecule. A general survey of useful surfactants is found in the Encyclopedia of Chemical Technology under the heading "Surfactants and Detersive Systems", Third Edition, Kirk-Othmer, Volume 22, pp. 332–432 (1983, John Wiley and Son, New York) and the aforementioned compilation published under the name of McCutcheon's. These references are both incorporated herein by reference.

Among the useful anionic surfactant types are the widely known carboxylate soaps, organo sulfates, sulfonates, sulfocarboxylic acids and their salts, and phosphates. Useful cationic surfactants include nitrogen compounds such as amine oxides and the well-known quaternary ammonium salts. Amphoteric surfactants include amino acid-type materials and similar types. Various cationic, anionic and amphoteric dispersants are available from the industry, particularly from such companies as Rohm & Haas and Union Carbide Corporation, both of America. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

These surfactants, when used, are generally employed in effective amounts to aid in the dispersal of the various additives, particularly the functional additives discussed below, in the concentrates and water-based functional fluids of the invention. Preferably, the concentrates can contain up to about 75% by weight, more preferably from about 10% to about 75% by weight of one or more of these surfactants. The water-based functional fluids can contain up to about 15% by weight, more preferably from about 0.05% to about 15% by weight of one or more of these surfactants.

Thickeners

Often the aqueous compositions of this invention contain at least one thickener for thickening said composition. Generally, these thickeners can be polysaccharides, synthetic thickening polymers, or mixtures of two or more of these. Among the polysaccharides that are useful are natural gums such as those disclosed in "Industrial Gums" by Whistler and B. Miller, published by Academic Press, 1959. Disclosures in this book relating to water-soluble thickening natural gums is hereby incorporated by reference. Specific examples of such gums are gum agar, guar gum, gum arabic, algin, dextrans, xanthan gum and the like. Also among the polysaccharides that are useful as thickeners for the aqueous compositions of this invention are cellulose ethers and esters, including hydroxy hydrocarbyl cellulose and hydrocarbylhydroxy cellulose and its salts. Specific examples of such thickeners are hydroxyethyl cellulose and the sodium salt of carboxymethyl cellulose. Mixtures of two or more of any such thickeners are also useful.

It is a general requirement that the thickener used in the aqueous compositions of the present invention be soluble at temperatures in the range of about 10° C. to about 90° C., preferably about 20° C. to about 60° C. This excludes such materials as methyl cellulose which is soluble in cold (i.e., about 10° C.) water but not in hot (i.e., about 90° C.) water. Such hot-water-soluble materials, however, can be used to perform other functions such as providing lubricity to the aqueous compositions of this invention.

These thickeners can also be synthetic thickening polymers. Many such polymers are known to those of skill in the art. Representative of them are polyacrylates, polyacrylamides, hydrolyxed vinyl esters, water-soluble homo- and interpolymers of acrylamidoalkane sulfonates containing 50 mole percent at least of acryloamido alkane sulfonate and other comonomers such as acrylonitrile, styrene and the like. Poly-n-vinyl pyrrolidones, homo- and copolymers as well as water-soluble salts of styrene, maleic anhydride and isobutylene maleic anhydride copolymers can also be used as thickening agents.

U.S. Pat. No. 3,005,776 is incorporated herein by reference for its disclosure of water-soluble thickeners which are described as being organic polyalkyleneoxy addition products of ethylene diamine which contain a hydrophobic element consisting of a polyoxypropylene polymer chain constituting about 10% to about 50% by weight of the compound, and a hydrophilic portion consisting of a polyoxyethylene polymer chain which constitutes about 90% to about 40% by weight of the compound. The addition product is designated as N,N,N',N'-tetrakis[hydroxypoly (oxyethylene-oxypropylene)] ethylenediamine and may be represented by the formula

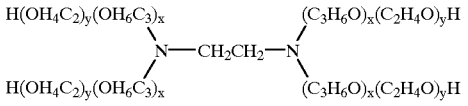

wherein x and y, respectively, are numbers having a value of at least about 8 to about 100 whereby the molecular weight of the compound, based on the hydroxyl value, is at least about 20,000, and is preferably such that the average molecular weight is within the range of about 20,000 to about 60,000 or higher, e.g., about 100,000.

U.S. Pat. No. 3,346,501 is incorporated herein by reference for its disclosure of organic polymeric thickeners which comprise a copolymer of ethylene oxide and 1,2-propylene oxide or 1,3-propylene oxide, preferably one containing more than about 50 mole percent of ethylene oxide and less than about 50 mole percent of the propylene oxide, copolymerized to a thick fluid polymer. A useful thickener may be made by copolymerizing about 75 mole percent of ethylene oxide and about 25 mole percent of isopropylene oxide to an average molecular weight of about 10,000 to about 25,000. The polymers can be represented by the formula

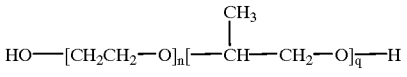

in which n and q are whole numbers, and n/q is greater than 1.

U.S. Pat. Nos. 4,138,346 and 4,151,099 are incorporated herein by reference for their disclosures of thickeners which are described as being polyoxyalkylene polyols containing ethylene oxide and propylene oxide in an oxide ratio of between about 100:0 to about 70:30 ethylene oxide-propylene oxide. The references indicate that these thickeners are commercially available and sold under the trademark "Ucon 75H-90,000" by Union Carbide and that they have a pour point of 40° F., a flash point of 485° F., a specific gravity at 20° C. of 1.095, and a viscosity of about 90,000 S.U.S. at 100° F.

U.S. Pat. No. 4,288,639 is incorporated herein by reference for its disclosure of liquid thickeners obtained by capping with an alpha-olefin oxide, a liquid straight-chain polyoxyalkylene heteric or block copolymer intermediate which is prepared by reacting ethylene oxide and at least one other lower alkylene oxide having 3 to 4 carbon atoms with an active hydrogen-containing aliphatic or alkylaromatic initiator having only one hydrogen atom and about 12 to about 18 aliphatic carbon atoms. These thickeners are prepared at a molecular weight of from about 1000 to about 25,000, preferably about 1000 to about 10,000. The alpha-olefin oxide has a carbon chain of about 12 to about 18 aliphatic carbon atoms. Alternatively, the thickeners can be prepared by copolymerizing a mixture of ethylene oxide and said lower alkylene oxides in the presence of said alpha-olefin oxide. In addition, ethylene oxide homopolymers capped with said alpha-olefin oxide are useful.

Other useful thickeners are known to those of skill in the art and many can be found in the list in the aforementioned 1983 McCutcheon publication "Functional Materials," pp. 224–240, inclusive. The disclosures therein, relative to water-soluble polymeric thickening agents meeting the general requirements set forth above are hereby incorporated by reference.

Preferred thickeners, particularly when the compositions of the invention are required to be stable under high shear applications, are the water-dispersible reaction products formed by reacting at least one hydrocarbyl-substituted succinic acid and/or anhydride represented by the formula

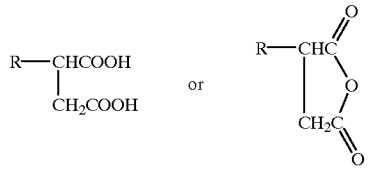

wherein R is a hydrocarbyl group of from about 8 to about 40 carbon atoms, with at least one water-dispersible amine terminated poly(oxyalkylene) or at least one water-dispersible hydroxy-terminated poly(oxyalkylene). R preferably has from about 8 to about 30 carbon atoms, more preferably from about 12 to about 24 carbon atoms, still more preferably from about 16 to about 18 carbon atoms. In a preferred embodiment, R is represented by the formula

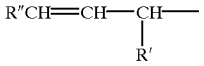

wherein R' and R" are independently hydrogen or straight chain or substantially straight chain hydrocarbyl groups, with the proviso that the total number of carbon atoms in R is within the above-indicated ranges. Preferably R' and R" are alkyl or alkenyl groups. In a particularly advantageous embodiment, R has from about 16 to about 18 carbon atoms, R' is hydrogen or an alkyl group of from 1 to about 7 carbon atoms or an alkenyl group of from 2 to about 7 carbon atoms, and R" is an alkyl or alkenyl group of from about 5 to about 15 carbon atoms.

The water-dispersible amine terminated poly (oxyalkylene)s are preferably alpha omega diamino poly (oxyethylene)s, alpha omega diamino poly(oxypropylene) poly(oxyethylene) poly(oxypropylene)s or alpha omega diamino propylene oxide capped poly(oxyethylene)s. The amine-terminated poly(oxyalkylene) can also be a urea condensate of such alpha omega diamino poly(oxyethylene)s, alpha omega diamino poly (oxypropylene) poly(oxyethylene) poly(oxypropylene)s or alpha omega diamino propylene oxide capped poly(oxyethylene)s. The amine-terminated poly(oxyalkylene) can also be a polyamino (e.g., triamino, tetramino, etc.) polyoxyalkylene provided it is amine-terminated and it is water-dispersible. In the compounds that contain both poly(oxyethylene) and poly (oxypropylene) groups, the poly(oxyethylene) groups preferably predominate to provide the desired water dispersibility. The terminal amines can be primary amines, e.g., —$NH_2$, or secondary amines, e.g., —NHR* wherein R* is a hydrocarbyl group of from 1 to about 18 carbon atoms, preferably from 1 to about 4 carbon atoms. R* is preferably an alkyl or an alkenyl group. The amine-terminated poly(oxyalkylene)s generally have a number average molecular weight of at least about 2000, preferably in the range of about 2000 to about 30,000, more preferably in the range of about 2000 to about 10,000, more preferably in the range of about 3500 to about 6500. In a preferred embodiment, these compounds are represented by the formula

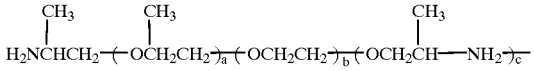

wherein a is a number in the range of from zero to about 200; b is a number in the range of from about 10 to about 650; and c is a number in the range of from zero to about 200. In another preferred embodiment, these compounds are represented by the formula

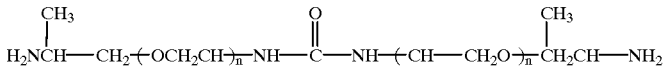

wherein n is a number sufficient to provide said compound with a number average molecular weight of at least about 2000, preferably from about 2000 to about 10,000. Examples of water-dispersible amine-terminated poly) oxyalkylene)s that are useful in accordance with the present invention are disclosed in U.S. Pat. Nos. 3,021,232; 3,108,011; 4,444,566; and Re 31,522. The disclosures of these patents are incorporated herein by reference. Water-dispersible amine terminated poly(oxyalkylene)s that are useful are commercially available from the Texaco Chemical Company under the trade name Jeffamine.

The water-dispersible hydroxy-terminated polyoxyalkylenes are preferably block polymers of propylene oxide and ethylene oxide with a nucleus derived from organic compounds containing a plurality of reactive hydrogen atoms. The block polymers are attached to the nucleus at the sites of the reactive hydrogen atoms. Examples of these compounds include the hydroxy-terminated polyoxyalkylenes which are represented by the formula

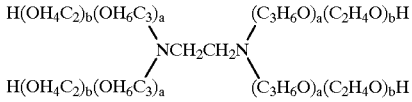

wherein a and b are integers such that the collective molecular weight of the oxypropylene chains range from about 900 to about 25,000, and the collective weight of the oxyethylene chains constitute from about 20% to about 90%, preferably from about 25% to about 55% by weight of the compound. These compounds are commercially available from BASF Wyandotte Corporation under the tradename "Tetronic". Additional examples include the hydroxy-terminated polyoxyalkylenes represented by the formula

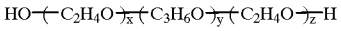

wherein y is an integer such that the molecular weight of the oxypropylene chain is at least about 900, and x and z are integers such that the collective weight of the oxyethylene chains constitute from about 20% to about 90% by weight of the compound. These compounds preferably have a molecular weight in the range of about 1100 to about 14,000. These compounds are commercially available from BASF Wyandotte Corporation under the tradename "Pluronic". Useful hydroxy-terminated polyoxyalkylenes are disclosed in U.S. Pat. Nos. 2,674,619 and 2,979,528, which are incorporated herein by reference.

The reaction between the carboxylic agent and the amine- or hydroxy-terminated polyoxyalkylene can be carried out at a temperature ranging from the highest of the melt temperatures of the reaction components up to the lowest of the decomposition temperatures of the reaction components or products. Generally, the reaction is carried out at a temperature in the range of about 60° C. to about 160° C., preferably about 120° C. to about 160° C. The ratio of equivalents of carboxylic agent to polyoxyalkylene preferably ranges from about 0.1:1 to about 8:1, preferably about 1:1 to about 4:1, and advantageously about 2:1. The weight of an equivalent of the carboxylic agent can be determined by dividing its molecular weight by the number of carboxylic functions present. The weight of an equivalent of the amine-terminated polyoxyalkylene can be determined by dividing its molecular weight by the number of terminal amine groups present. The weight of an equivalent of the hydroxy-terminated polyoxyalkylene can be determined by dividing its molecular weight by the number of terminal terminal hydroxyl groups present. The number of terminal amine and hydroxyl groups can usually be determined from the structural formula of the polyoxyalkylene or empirically through well known procedures. The amide/acids and ester/acids formed by the reaction of the carboxylic agent and amine-terminated or hydroxy-terminated polyoxyalkylene can be neutralized with, for example, one or more alkali metals, one or more amines, or a mixture thereof, and thus converted to amide/salts or ester/salts, respectively. Additionally, if these amide/acids or ester/acids are added to concentrates or functional fluids containing alkali metals or amines, amide/salts or ester/salts usually form, in situ.

South African Pat. No. 85/0978 is incorporated herein by reference for its teachings with respect to the use of hydrocarbyl-substituted succinic acid or anhydride/hydroxy-terminated poly(oxyalkylene) reaction products as thickeners for aqueous compositions.

When the thickener is formed using an amine-terminated poly(oxyalkylene), the thickening characteristics of said thickener can be enhanced by combining it with at least one surfactant. Any of the surfactants identified above under the subtitle "Surfactants" can be used in this regard. When such surfactants are used, the weight ratio of thickener to surfactant is generally in the range of from about 1:5 to about 5:1, preferably from about 1:1 to about 3:1.

Typically, the thickener is present in a thickening amount in the aqueous compositions of this invention. When used, the thickener is preferably present at a level of up to about 70% by weight, preferably from about 3% to about 50% by weight of the concentrates of the invention. The thickener is preferably present at a level in the range of from about 0.1% to about 10% by weight, preferably from about 0.3% to about 6% by weight of the functional fluids of the invention.

Oil-Soluble, Water-Insoluble Functional Additives

The functional additives that can be used are typically oil-soluble, water-insoluble additives which function in conventional oil-based systems as extreme pressure agents, anti-wear agents, load-carrying agents, dispersants, friction modifiers, lubricity agents, etc. They can also function as anti-slip agents, film formers and friction modifiers. As is well known, such additives can function in two or more of the above-mentioned ways; for example, extreme pressure agents often function as load-carrying agents.

The term "oil-soluble, water-insoluble functional additive" refers to a functional additive which is not soluble in water above a level of about 1 gram per 100 milliliters of water at 25° C., but is soluble in mineral oil to the extent of at least 1 gram per liter at 25° C.

These functional additives can also include certain solid lubricants such as graphite, molybdenum disulfide and polytetrafluoroethylene and related solid polymers.

These functional additives can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369–392, and West German Published Patent Application No. 2,339,065. These disclosures are hereby incorporated by reference for their discussions of frictional polymer formers.

Typically these functional additives are known metal or amine salts or organo sulfur, phosphorus, boron or carboxylic acids which are the same as or of the same type as used in oil-based fluids. Typically such salts are of carboxylic acids of 1 to 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphates and phosphites; borate amine salts, chlorinated waxes; trialkyl tin oxide, molybdenum phosphates, and chlorinated waxes.

Many such functional additives are known to the art. For example, descriptions of additives useful in conventional oil-based systems and in the aqueous systems of this invention are found in "Advances in Petroleum Chemistry and Refining", Volume 8, edited by John. J. McKetta, Interscience Publishers, New York, 1963, pages 31–38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the compositions of this invention.

In certain of the typical aqueous compositions of the invention, the functional additive is a sulfur or chloro-sulfur extreme pressure agent, known to be useful in oil-base systems. Such materials include chlorinated aliphatic hydrocarbons, such as chlorinated wax; organic sulfides and polysulfides, such as benzyl-disulfide, bis-(chlorobenzyl) disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioic acid, such as zinc dicyclohexyl phosphorodithioate, and the zinc salts of a phosphorodithioic acid.

The functional additive can also be a film former such as a synthetic or natural latex or emulsion thereof in water. Such latexes include natural rubber latexes and polystyrene butadienes synthetic latex.

The functional additive can also be anti-chatter or anti-squawk agent. Examples of the former are the amide metal dithiophosphate combinations such as disclosed in West German Pat. No. 1,109,302; amine salt-azomethene combinations such as disclosed in British Patent Specification No. 893,977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the aqueous systems of the present invention.

Mixtures of two or more of any of the afore-described functional additives can also be used.

Typically, a functionally effective amount of the functional additive is present in the aqueous compositions of this invention.

The term "functionally effective amount" refers to a sufficient quantity of an additive to impart desired properties intended by the addition of said additive. For example, if an additive is a rust-inhibitor, a functionally effective amount of said rust-inhibitor would be an amount sufficient to increase the rust-inhibiting characteristics of the composition to which it is added. Similarly, if the additive is an anti-wear agent, a functionally effective amount of said anti-wear agent would be a sufficient quantity of the anti-wear agent to improve the anti-wear characteristics of the composition to which it is added.

Supplemental Additives

The aqueous compositions of this invention often contain at least one inhibitor for corrosion of metals. These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion-inhibitor without dissolving in water, it need not be water-soluble. Many suitable inorganic inhibitors useful in the aqueous systems of the present invention are known to those skilled in the art. Included are those described in "Protective Coatings for Metals" by Burns and Bradley, Reinhold Publishing Corporation, Second Edition, Chapter 13, pages 596–605; these pages being incorporated herein by reference. Specific examples of useful inorganic inhibitors include alkali metal nitrites, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compound, such as neutralized phosphates and hydrocarbyl phosphate esters, neutralized fatty acids (e.g., those having about 8 to about 22 carbon atoms), neutralized aromatic carboxylic acids (e.g., 4-tertiary-butyl benzoic acid), neutralized naphthenic acids and neutralized hydrocarbyl sulfonates. Mixed salt esters of alkylated succinimides are also useful. Particularly useful amines include the alkanol amines such as ethanol amine, diethanolamine. Mixtures of two or more of any of the afore-described corrosion-inhibitors can also be used. The corrosion-inhibitor is usually present in concentrations in which they are effective in inhibiting corrosion of metals and with which the aqueous composition comes in contact.

Certain of the aqueous composition of the present invention (particularly those that are used in cutting or shaping of metal) can also contain at least one polyol with inverse solubility in water. Such polyols are those that become less soluble as the temperature of the water increases. They thus can function as surface lubricity agents during cutting or working operations since, as the liquid is heated as a result of friction between a metal workpiece and worktool, the polyol of inverse solubility "plates out" on the surface of the workpiece, thus improving its lubricity characteristics.

The aqueous compositions of the present invention can also include at least one bactericide. Such bactericides are well known of those of skill in the art and specific examples can be found in the afore-mentioned 1983 McCutcheon publication "Functional Materials" under the heading "Antimicrobials/Bactericides/Disinfectants/Fungicides" on pages 10–20 thereof; these pages being incorporated herein by reference.

The aqueous compositions of the present invention can also include such other materials as dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The aqueous compositions of this invention may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

It should also be noted that many of the ingredients described above for use in making the aqueous compositions of this invention are industrial products which exhibit or confer more than one property on such aqueous compositions. Thus, a single ingredient can provide several functions thereby eliminating or reducing the need for some other additional ingredient. Thus, for example, an extreme pressure agent such as tributyl tin oxide can also function as a bactericide.

Illustrative concentrates within the scope of the invention are disclosed in Table I. In Table I, all numerical values are in parts by weight.

TABLE I

| | A | B |
|---|---|---|
| Product of Example 1 | 111.6 | — |
| Product of Example 6 | — | 111.6 |
| Diluent Oil | 8.8 | 8.8 |
| Diethanolamine | 58.2 | 58.2 |
| Unitol DT-40 (product of Union Camp Corp. identified as a distilled tail oil acid) | 22.7 | 22.7 |
| Tergitol 15-S-7 (product of Union Carbide identified as a polyethylene glycol ether of a secondary alcohol) | 14.7 | 14.7 |
| Water | 689.5 | 689.5 |
| Ethanolamine | 56.6 | 56.6 |
| Foam Ban MS-30 (product of Ultra Adhesives identified as a silicon defoamer) | 2.9 | 2.9 |
| Zinc salt of methylamyl phosphorodithioic acid | 35.0 | 35.0 |

Water-based hydraulic fluids are formulated by diluting concentrates A and B from Table I with water at a ratio of 3:97, that is, three parts of concentrate per 97 parts of water.

While the invention has been explained in relation to its preferred embodiment, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A [hydraulic or functional fluid] *water-based* composition [consisting essentially of] *comprising* a continuous water phase*, at least one surfactant, less than about 5% by weight hydrocarbon oil* and at least one carboxylic salt dispersed or dissolved in said water phase, said salt being [derived from] *made by the reaction of component* (*A*) *with component* (*B*) *under salt-forming conditions*:

*component* (*A*) *being selected from the group consisting of* (A)(I) at least one hydrocarbyl-substituted [alpha-beta olefinically unsaturated anhydride or acid thereof] *carboxylic acid or anhydride*, the hydrocarbyl substituent of said acid or anhydride having an average of from [about 30] *at least 50* to about 500 carbon atoms [reacted], *or* (*A*)(*II*) *at least one derivative formed by reacting at least one of said hydrocarbyl-substitued carboxylic acid or anhydride* with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydrocarbyl-substituted acid or anhydride simultaneously or sequentially in any order; and

*component* (B) *being selected from the group consisting of ammonia, or* at least one amine[, alkali or alkaline earth metal, or alkali or alkaline earth metal compound]; with the proviso that:

(*i*) *when component* (*A*) *is said hydrocarbyl-substituted carboxylic acid or anhydride* (*A*)(*I*)*: the reaction between component* (*A*) *and component* (*B*) *is conducted at a temperature of up to about 130° C.; and component* (*B*) *is other than an N-*(*hydroxyl-substituted hydrocarbyl*) *amine and/or hydroxyl-substituted poly* (*hydrocarbyloxy*) *analog of said N-*(*hydroxyl-substituted hydrocarbyl*) *amine;*

(ii) when component (A) is the reaction product of said hydrocarbyl-substituted carboxylic acid or anhydride and an N-(hydroxyl-substituted hydrocarbyl) amine and/or hydroxyl-substituted poly(hydrocarbyloxy) analog of said N-(hydroxyl-substituted hydrocarbyl) amine, component (B) is other than an N-(hydroxyl-substituted hydrocarbyl) amine and/or hydroxyl-substituted poly(hydrocarbyloxy) analog of said N-(hydroxyl-substituted hydrocarbyl) amine; and (iii) said primary amine (c), said secondary amine (d) and said amine (B) being other than an amino sulfonic acid.

2. The composition of claim 1 wherein said hydrocarbyl-substituted carboxylic acid or anhydride is a monocarboxylic acid or anhydride.

3. The composition of claim 1 wherein said hydrocarbyl-substituted carboxylic acid or anhydride is a polycarboxylic acid or anhydride.

4. The composition of claim 1 wherein hydrocarbyl-substituted carboxylic acid or anhydride is represented by the formulae

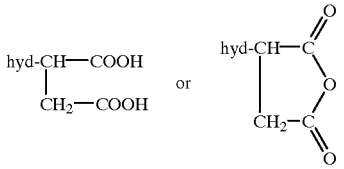

wherein hyd is said hydrocarbyl substituent.

[5. The composition of claim 1 wherein said hydrocarbyl substituent has an average of from about 40 to about 500 carbon atoms.]

[6. The composition of claim 1 wherein said hydrocarbyl substituent has an average of from about 50 to about 500 carbon atoms.]

7. The composition of claim 1 wherein said hydrocarbyl substituent is an alkyl or an alkenyl group.

8. The composition of claim 1 wherein said hydrocarbyl substituent is a poly(isobutylene) group.

9. The composition of claim 1 wherein said primary amine contains at least one —$NH_2$ group.

10. The composition of claim 1 wherein said primary amine is a monoamine.

11. The composition of claim 1 wherein said primary amine is a polyamine.

12. The composition of claim 1 wherein said primary amine is aliphatic, cycloaliphatic, aromatic or heterocyclic.

13. The composition of claim 1 wherein said primary amine is a polyalkylene polyamine, branched polyalkylene polyamine, polyoxyalkylene polyamine or hydrocarbyl-substituted amine.

14. The composition of claim 1 wherein said primary amine is hydrazine or a substituted hydrazine.

15. The composition of claim 1 wherein said secondary amine contains at least one >NH group.

16. The composition of claim 1 wherein said secondary amine is a monoamine.

17. The composition of claim 1 wherein said secondary mine is a polyamine.

18. The composition of claim 1 wherein said secondary amine is aliphatic, cycloaliphatic, aromatic or heterocyclic.

19. The composition of claim 1 wherein said secondary amine is a polyalkylene polyamine, branched polyalkylene polyamine, polyoxyalkylene polyamine or hydrocarbyl-substituted amine.

20. The composition of claim 1 wherein said secondary amine is a substituted hydrazine.

21. The composition of claim 1 wherein said primary amine and/or said secondary amine is an alkylene polyamine of the formula

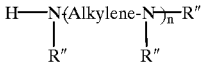

wherein n is a number in the range of from 1 to about 10, each R" is independently a hydrogen atom or a hydrocarbyl group having up to about 30 carbon atoms, and the Alkylene group has from 1 to about 10 carbon atoms.

22. The composition of claim 1 wherein said alcohol is a monohydric alcohol.

23. The composition of claim 1 wherein said alcohol is a polyhydric alcohol.

24. The composition of claim 1 wherein said alcohol is aliphatic, cycloaliphatic, aromatic or heterocyclic.

25. The composition of claim 1 wherein said alcohol is a compound represented by the formula

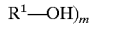

wherein $R^1$ is a monovalent or polyvalent organic group joined to the OH groups through carbon-to-oxygen bonds and m is an integer of from 1 to about 10.

26. The composition of claim 1 wherein said alcohol is a monohydroxy aromatic compound and/or polyhydroxy aromatic compound.

27. The composition of claim 1 wherein said hydroxyamine has at least one —$NH_2$ group and/or at least one >NH group.

28. The composition of claim 1 wherein said hydroxyamine is (a') at least one N-(hydroxyl-substituted hydrocarbyl)amine, (b') at least one hydroxyl-substituted poly(hydrocarbyloxy) analog of (a'), or (c') a mixture of (a') and (b').

29. The composition of claim 1 wherein said hydroxyamine has up to about 40 carbon atoms.

30. The composition of claim 1 wherein said hydroxyamine is at least one alkanol amine selected from (a') primary, secondary and tertiary alkanol amines represented correspondingly by the formulae

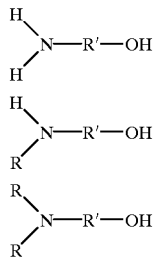

(b') hydroxyl-substituted oxyalkylene analogs of said alkanol amines represented correspondingly by the formulae

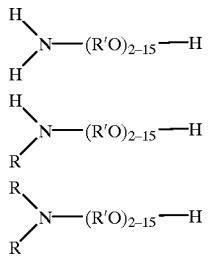

wherein each R is independently a hydrocarbyl group of one to about 8 carbon atoms of a hydroxyl-substituted hydrocarbyl group of 2 to about 8 carbon atoms and R' is a divalent hydrocarbyl group of 2 to about 18 carbon atoms, or (c') mixtures of two of more of said alkanol amines and/or said analogs of said alkanol amines.

31. The composition of claim 1 wherein said hydroxyamine is diethylethanolamine.

32. The composition of claim 1 wherein said hydroxyamine comprises ethanolamine and diethylethanolamine.

33. The composition of claim 1 wherein component (B) comprises at least one monoamine.

34. The composition of claim 1 wherein component (B) comprises at least one polyamine.

35. The composition of claim 1 wherein component (B) comprises at least one primary, secondary and/or tertiary amine.

36. The composition of claim 1 wherein component (B) has at least one —$NH_2$ group and/or at least one >NH group.

37. The composition of claim 1 wherein component (B) comprises at least one aliphatic, cycloaliphatic, heterocyclic and/or aromatic monoamine.

38. The composition of claim 1 wherein component (B) comprises at least one aliphatic, cycloaliphatic, heterocyclic and/or aromatic polyamine.

39. The composition of claim 1 wherein component (B) comprises at least one alkylene polyamine of the formula

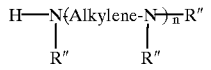

wherein n is a number of from 1 to about 10, each R" is independently a hydrogen atom or a hydrocarbyl group having up to about 30 carbon atoms, and the Alkylene group has from 1 to about 10 carbon atoms.

40. The composition of claim 1 wherein component (B) is a polyalkylene polyamine, branched polyalkylene polyamine, polyoxyalkylene polyamine or hydrocarbyl-substituted amine.

41. The composition of claim 1 wherein component (B) is hydrazine or a substituted hydrazine.

42. The composition of claim 1 wherein component (B) comprises at least one hydroxyamine.

43. The composition of claim 1 wherein component (B) comprises (a') at least one N-(hydroxyl-substituted hydrocarbyl)amine, (b') at least one hydroxyl-substituted poly(hydrocarbyloxy) analog of (a'), or (c') a mixture of (a') and (b').

44. The composition of claim 1 wherein component (B) comprises at least one alkanol amine containing up to about 40 carbon atoms.

45. The composition of claim 1 wherein component (B) is selected from the group consisting of (a') [primary,] secondary and tertiary alkanol amines represented correspondingly by the formulae

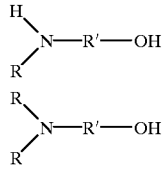

(b') hydroxy-substituted oxyalkylene analogs of said alkanol amines represented correspondingly by the formulae

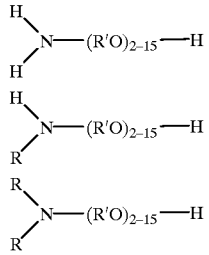

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, or (c') mixtures of two or more of said alkanol amines and/or said analogs of said alkanol amines.

46. The composition of claim 1 wherein component (B) comprises diethylethanolamine.

[47. The composition of claim 1 wherein component (B) comprises ethanolamine and diethylethanolamine.]

48. The composition of claim 1 wherein component (B) comprises ammonia.

[49. The composition of claim 1 wherein component (B) comprises at least one alkali metal or alkali metal compound.]

[50. The composition of claim 1 wherein component (B) comprises sodium hydroxide.]

[51. The composition of claim 1 wherein said composition further comprises at least one surfactant.]

52. The composition of claim [51] *1* wherein said surfactant comprises a cationic, anionic, nonionic and/or amphoteric surfactant.

53. The composition of claim [51] *1* wherein said surfactant comprises at least one alkylene oxide-treaded hydroxyaromatic compound, alcohol, ester, amine and/or amide.

54. The composition of claim [51] *1* wherein said surfactant comprises at least one ethylene oxide-treated hydroxyaromatic compound, alcohol, ester, amine and/or amide.

55. The composition of claim [51] *1* wherein said surfactant comprises at least one ethylene oxide propylene oxide block copolymer.

56. The composition of claim [51] *1* wherein said surfactant comprises at least one glycerol ester and/or sugar ester.

57. The composition of claim [51] *1* wherein said surfactant comprises at least one alkylene oxide-treated alkyl phenol condensate.

58. The composition of claim [51] *1* wherein said surfactant comprises at least one ethoxylated alkyl phenol.

59. The composition of claim [51] *1* wherein said surfactant comprises at least one soap, organo sulfate, sulfonate, sulfocarboxylic acid and/or salt thereof, or phosphate.

60. The composition of claim [51] *1* wherein said surfactant comprises at least one amine oxide.

61. The composition of claim [51] *1* wherein said surfactant comprises at least one quaternary ammonium salt.

62. The composition of claim 1 wherein said composition further comprises at least one thickener.

63. The composition of claim 62 wherein said thickener is derived from at least one hydrocarbyl-substituted succinic acid and/or anhydride represented by the formula

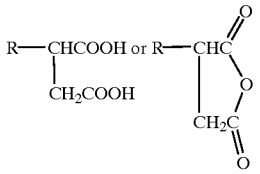

wherein R is a hydrocarbyl group of from about 8 to about 40 carbon atoms, and at least one water-dispersible amine terminated poly(oxyalkylene).

[64. The composition of claim 63 wherein said composition further comprises at least one surfactant.]

65. The composition of claim 62 wherein said thickener is derived from at least one compound represented by the formula

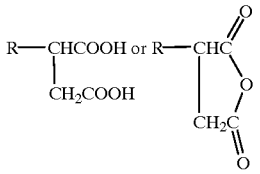

wherein R is an alkenyl group represented by the formula

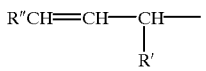

and R' and R" are independently hydrogen or straight chain or substantially straight chain hydrocarbyl groups of at least one carbon atoms, with the proviso that R has from about 8 to about 30 carbon atoms, and at least one water-soluble hydroxy terminated polyoxyalkylene, said polyoxyalkylene containing oxypropylene and oxyethylene chains and a nucleus derived from a reactive hydrogen compound containing at least one nitrogen atoms.

66. The composition of claim 1 wherein said composition further comprises at least one normally oil-soluble, water-insoluble functional additive.

67. The composition of claim 66 wherein said functional additive comprises at least one anti-wear, extreme pressure, load-carrying and/or dispersing agent.

68. The composition of claim 66 wherein said functional additive is a phosphorus- and/or sulfur-containing material.

69. The composition of claim 1 wherein said composition further comprises at least one inhibitor for corrosion of metal.

70. The composition of claim 1 wherein said composition further comprises at least one polyol with inverse solubility in water.

71. The composition of claim 1 wherein said composition further comprises at least one bactericide.

72. The composition of claim 1 wherein said composition further comprises at least one dye, water softener, odor masking agent, anti-foamant, anti-freeze additive, or a mixture of two or more thereof.

[73. The composition of claim 1 wherein the water content of said composition is in the range of from about 25% to about 90% by weight of said composition.]

[74. A water-based functional fluid made by diluting the composition of claim 73 with water, the weight ratio of water to said concentrate being in the range of about 80:20 to about 99:1.]

[75. The composition of claim 1 wherein the water content of said composition is in excess of about 80% by weight of said composition.]

76. A hydraulic or functional fluid composition consisting essentially of a continuous water phase and at least one carboxylic salt dispersed or dissolved in said water phase, said salt being derived from:

(A)(I) at least one hydrocarbyl-substituted alpha-beta olefinically unsaturated anhydride or acid thereof, the hydrocarbyl substituent of said acid or anhydride having an average of from about 30 to about 500 carbon atoms reacted, with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydrocarbyl-substituted acid or anhydride simultaneously or sequentially in any order; and (B) at least one amine; with the proviso that:

(ii) when component (A) is the reaction product of said hydrocarbyl-substituted carboxylic acid or anhydride and an N-(hydroxyl-substituted hydrocarbyl)amine and/or hydroxyl-substituted poly(hydrocarbyloxy) analog of said N-(hydroxyl-substituted hydrocarbyl) amine, component (B) is other than an N-(hydroxyl-substituted hydrocarbyl)amine and/or hydroxyl-substituted poly(hydrocarbyloxy) analog of said N-(hydroxyl-substituted hydrocarbyl)amine; and (iii) said primary amine (c), said secondary amine (d) and said amine (B) being other than an amino sulfonic acid.

*77. A water-based composition comprising a continuous water phase, at least one surfactant, less than about 5* by weight hydrocarbon oil and at least one carboxylic salt dispersed or dissolved in said water phase, said salt being made by the reaction of component (*A*) *with component* (*B*) *under salt-forming conditions:*

*component* (*A*) *being selected from the group consisting of* (*A*)(*I*) *at least one hydrocarbyl-substituted polycarboxylic acid or anhydride, the hydrocarbyl substituent of said acid or anhydride having an average of from at least 50 to about 500 carbon atoms, of* (*A*)(*II*) *at least one derivative formed by reacting at least one of said hydrocarbyl-substituted polycarboxylic acid or anhydride with a reactant selected from the group consisting of* (*a*) *ammonia,* (*b*) *alcohol,* (*c*) *primary amine,* (*d*) *secondary amine,* (*e*) *hydroxyamine or* (*f*) *a combination of two or more of any of* (*a*) *through* (*e*), *the components of* (*f*) *being reacted with said hydrocarbyl-substituted acid or anhydride simultaneously or sequentially in any order; and*

*component* (*B*) *being selected from the group consisting of ammonia, or at least one amine; with the proviso that:*

(*i*) *when component* (*A*) *is said hydrocarbyl-substituted polycarboxylic acid or anhydride* (*A*)(*I*): *the reaction between component* (*A*) *and component* (*B*) *is conducted at a temperature of up to about 130° C., and component* (*B*) *is selected from the group consisting*

*of ammonia, primary amine and secondary amine and is other than an N-(hydroxyl-substituted hydrocarbyl) amine and/or hydroxyl-substituted poly (hydrocarbyloxy) analog of said N-(hydroxyl-substituted hydrocarbyl) amine;*

*(ii) when component (A) is the reaction product of said hydrocarbyl-substituted carboxylic acid or anhydride and an N-(hydroxyl-substituted hydrocarbyl) amine and/or hydroxyl-substituted poly (hydrocarbyloxy) analog of said N-(hydroxyl-substituted hydrocarbyl) amine, component (B) is other than an N-(hydroxyl-substituted hydrocarbyl) amine and/or hydroxyl-substituted poly (hydrocarbyloxy) analog of said N-(hydroxyl-substituted hydrocarbyl) amine; and*

*(iii) said primary amine (c), said secondary amine (d) and said amine (B) being other than an amino sulfonic acid.*

*78. A water-based composition comprising a continuous water phase, at least one surfactant, less than about 5* by weight hydrocarbon oil and at least one carboxylic salt dispersed or dissolved in said water phase, said salt being made by the reaction of component (A) *with component (B) under salt-forming conditions:*

*component (A) being selected from the group consisting of (A)(I) at least one hydrocarbyl-substituted carboxylic acid or anhydride, the hydrocarbyl substituent of said acid or anhydride having an average of from at least 50 to about 500 carbon atoms, said hydrocarbyl substituent being other than alicyclic or aromatic, (A)(II) at least one derivative formed by reacting at least one of said hydrocarbyl-substituted carboxylic acid or anhydride with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydrocarbyl-substituted acid or anhydride simultaneously or sequentially in any order; and*

*component (B) being selected from the group consisting of ammonia, or at least one amine; with the proviso that:*

*(i) when component (A) is said hydrocarbyl-substituted carboxylic acid or anhydride (A)(I): the reaction between component (A) and component (B) is conducted at a temperature of up to about 130° C.: and component (B) is selected from the group consisting of ammonia, primary amine and secondary amine and is other than an N-(hydroxyl-substituted hydrocarbyl) amine and/or hydroxyl-substituted poly (hydrocarbyloxy) analog of said N-(hydroxyl-substituted hydrocarbyl) amine;*

*(ii) when component (A) is the reaction product of said hydrocarbyl-substituted carboxylic acid or anhydride and an N-(hydroxyl-substituted hydrocarbyl) amine and/or hydroxyl-substituted poly (hydrocarbyloxy) analog of said N-(hydroxyl-substituted hydrocarbyl) amine, component (B) is other than an N-(hydroxyl-substituted hydrocarbyl) amine and/or hydroxyl-substituted poly (hydrocarbyloxy) analog of said N-(hydroxyl-substituted hydrocarbyl) amine; and*

*(iii) said primary amine (c), said secondary amine (d) and said amine (B) being other than an amino sulfonic acid.*

* * * * *